(12) United States Patent
Chopra et al.

(10) Patent No.: US 8,507,584 B2
(45) Date of Patent: *Aug. 13, 2013

(54) PHASE CHANGE INKS CONTAINING AMIDE GELLANT COMPOUNDS WITH AROMATIC END GROUPS

(75) Inventors: Naveen Chopra, Oakville (CA);
Michelle N. Chretien, Mississauga (CA); Barkev Keoshkerian, Thornhill (CA); Jennifer L. Belelie, Oakville (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 528 days.

This patent is subject to a terminal disclaimer.

(21) Appl. No.: 12/765,138

(22) Filed: Apr. 22, 2010

(65) Prior Publication Data

US 2011/0263769 A1 Oct. 27, 2011

(51) Int. Cl.
| B01F 3/04 | (2006.01) |
| B41J 2/01 | (2006.01) |
| B41J 2/05 | (2006.01) |
| B41J 2/17 | (2006.01) |
| B41J 2/175 | (2006.01) |
| C07D 209/48 | (2006.01) |
| C08F 2/46 | (2006.01) |
| C08G 18/28 | (2006.01) |
| C08G 18/67 | (2006.01) |
| C08J 3/28 | (2006.01) |
| C08K 5/00 | (2006.01) |
| C08K 5/20 | (2006.01) |
| C09D 5/00 | (2006.01) |
| C09D 11/00 | (2006.01) |
| G01D 11/00 | (2006.01) |

(52) U.S. Cl.
USPC ............ 523/160; 347/1; 347/60; 347/85; 347/95; 347/100; 347/102; 522/114; 522/116; 522/136; 522/139; 522/173; 522/174; 522/176; 523/161; 524/210; 524/218; 524/219; 524/220; 524/222; 524/223; 524/227; 106/31.13

(58) Field of Classification Search
USPC ............ 523/160, 161; 347/1, 60, 85, 95, 347/100, 102; 522/114, 116, 136, 139, 173, 522/174, 176; 524/210, 218, 219, 220, 222, 524/223, 227; 106/31.13
See application file for complete search history.

(56) References Cited

U.S. PATENT DOCUMENTS

| 4,889,560 A | 12/1989 | Jaeger et al. |
| 4,889,761 A | 12/1989 | Titterington et al. |
| 5,194,638 A | 3/1993 | Frihart et al. |
| 5,221,335 A | 6/1993 | Williams et al. |
| 5,372,852 A | 12/1994 | Titterington et al. |
| 5,389,958 A | 2/1995 | Bui et al. |
| 5,621,022 A | 4/1997 | Jaeger et al. |
| 5,783,657 A | 7/1998 | Pavlin et al. |
| 5,998,570 A | 12/1999 | Pavlin et al. |
| 6,111,055 A | 8/2000 | Berger et al. |
| 6,350,889 B1 | 2/2002 | Pavlin |
| 6,399,713 B1 | 6/2002 | MacQueen et al. |
| 6,492,458 B1 | 12/2002 | Pavlin |
| 7,271,284 B2 | 9/2007 | Toma et al. |
| 7,276,614 B2 | 10/2007 | Toma et al. |
| 7,279,587 B2 | 10/2007 | Odell et al. |
| 7,501,015 B2 | 3/2009 | Odell et al. |
| 7,559,639 B2 | 7/2009 | Belelie et al. |
| 8,097,661 B2 * | 1/2012 | Chopra et al. ............... 522/173 |
| 2003/0065084 A1 | 4/2003 | MacQueen et al. |
| 2006/0004123 A1 | 1/2006 | Wu et al. |
| 2006/0122354 A1 | 6/2006 | Carlini et al. |
| 2006/0132570 A1 | 6/2006 | Odell et al. |
| 2007/0012217 A1 | 1/2007 | Goredema et al. |
| 2007/0119337 A1 | 5/2007 | Breton et al. |
| 2007/0119338 A1 | 5/2007 | Breton et al. |
| 2007/0119339 A1 | 5/2007 | Kovacs et al. |
| 2007/0119340 A1 | 5/2007 | Breton et al. |
| 2007/0120908 A1 | 5/2007 | Odell et al. |
| 2007/0120909 A1 | 5/2007 | Belelie et al. |
| 2007/0120910 A1 | 5/2007 | Odell et al. |

(Continued)

OTHER PUBLICATIONS

German Patent Office Communication dated Jan. 16, 2012, for German Patent application No. 10 2011 006 968.2, 8 pages.

(Continued)

Primary Examiner — Patrick Niland
(74) Attorney, Agent, or Firm — Marylou J. Lavoie

(57) ABSTRACT

Disclosed is a phase change ink comprising a colorant, an initiator, and a phase change ink carrier, said carrier comprising at least one radically curable monomer compound and a compound of the formula

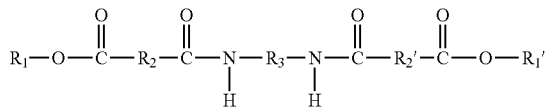

wherein $R_1$ and $R_{1'}$ are the same, and wherein $R_1$ and $R_{1'}$ are each an aromatic group; and wherein $R_2$ and $R_{2'}$ and $R_3$ each, independently of the others, are alkylene groups, arylene groups, arylalkylene groups, or alkylarylene groups; or wherein, in embodiments, $R_1$ and $R_{1'}$ can be the same or different, and wherein $R_1$ and $R_{1'}$ each, independently of the other is an alkyl group having a least one ethylenic unsaturation, an arylalkyl group having at least one ethylenic unsaturation, an alkylaryl group having at least one ethylenic unsaturation, or an aromatic group, provided that at least one of $R_1$ and $R_{1'}$ is an aromatic group; and provided that neither of $R_1$ or $R_{1'}$ is a photoinitiator group. Also disclosed herein is a method of printing with the phase change ink.

16 Claims, 4 Drawing Sheets

(56) References Cited

U.S. PATENT DOCUMENTS

| | | |
|---|---|---|
| 2007/0120919 A1 | 5/2007 | Goredema et al. |
| 2007/0120921 A1 | 5/2007 | Carlini et al. |
| 2007/0120922 A1 | 5/2007 | Belelie et al. |
| 2007/0120923 A1 | 5/2007 | Kovacs et al. |
| 2007/0120924 A1 | 5/2007 | Odell et al. |
| 2007/0120925 A1 | 5/2007 | Belelie et al. |
| 2007/0123601 A1 | 5/2007 | Belelie et al. |
| 2007/0123641 A1 | 5/2007 | Belelie et al. |
| 2007/0123642 A1 | 5/2007 | Banning et al. |
| 2007/0123663 A1 | 5/2007 | Toma et al. |
| 2007/0123722 A1 | 5/2007 | Toma et al. |
| 2007/0123723 A1 | 5/2007 | Odell et al. |
| 2007/0123724 A1 | 5/2007 | Belelie et al. |
| 2007/0283846 A1 | 12/2007 | Breton et al. |
| 2008/0000384 A1 | 1/2008 | Belelie et al. |

OTHER PUBLICATIONS

U.S. Patent Application filed Apr. 22, 2010, of Naveen Chopra et al., entitled "Amide Gellant Compounds With Aromatic End Groups" 55 pages, 2 drawing sheets, U.S. Appl. No. 12/765,148, not yet published.

U.S. Patent Application filed Apr. 22, 2010, entitled "Curable Compositions for Three-Dimensional Printing," 52 pages, U.S. Appl. No. 12/765,309, not yet published.

U.S. Patent Application filed Apr. 22, 2010, entitled "Ink Compositions and Methods," 53 pages, U.S. Appl. No. 12/765,341, not yet published.

Canadian Patent Office Communication dated Mar. 7, 2013, for Canadian Patent Application No. 2,737,612, 3 pages.

\* cited by examiner

PHASE CHANGE INKS CONTAINING AMIDE GELLANT COMPOUNDS WITH AROMATIC END GROUPS

RELATED APPLICATIONS

Commonly assigned U.S. Pat. No. 8,084,637, entitled "Amide Gellant Compounds With Aromatic End Groups"), filed concurrently herewith, which is hereby incorporated by reference herein in its entirety, describes amide gellant compounds with aromatic end groups.

BACKGROUND

Disclosed herein are amide gellant compounds with aromatic end groups and ink compositions containing the compounds. One embodiment disclosed herein is directed to a phase change ink comprising a colorant, an initiator, and a phase change ink carrier comprising at least one radically curable monomer compound and a compound of the formula

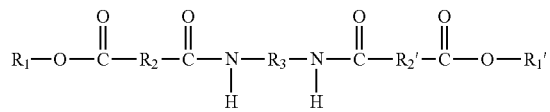

wherein $R_1$ and $R_{1'}$ are the same, and wherein $R_1$ and $R_{1'}$ each are aromatic groups; wherein $R_2$ and $R_{2'}$ are the same or different, and wherein $R_2$ and $R_{2'}$ are each independently selected from (i) alkylene groups, which can be linear or branched, saturated or unsaturated, cyclic or acyclic, substituted or unsubstituted alkylene groups, and wherein hetero atoms may optionally be present in the alkylene group; (ii) arylene groups, which can be substituted or unsubstituted arylene groups, and wherein hetero atoms may optionally be present in the arylene group; (iii) arylalkylene groups, which can be substituted or unsubstituted arylalkylene groups, wherein the alkyl portion of the arylalkylene group can be linear or branched, saturated or unsaturated, cyclic or acyclic, and substituted or unsubstituted, and wherein hetero atoms may optionally be present in either the aryl portion or the alkyl portion of the arylalkylene group; or (iv) alkylarylene groups, which can be substituted or unsubstituted alkylarylene groups, wherein the alkyl portion of the alkylarylene group can be linear or branched, saturated or unsaturated, cyclic or acyclic, and substituted or unsubstituted, and wherein hetero atoms may optionally be present in either the aryl portion or the alkyl portion of the alkylarylene group; and wherein $R_3$ is (i) a linear or branched alkylene group, which can be saturated or unsaturated, and substituted or unsubstituted alkylene groups, and wherein hetero atoms may optionally be present in the alkylene group; (ii) an arylene group, which can be substituted or unsubstituted arylene groups, and wherein hetero atoms may optionally be present in the arylene group; (iii) an arylalkylene group, which can be substituted or unsubstituted arylalkylene groups, wherein the alkyl portion of the arylalkylene group can be linear or branched, saturated or unsaturated, cyclic or acyclic, and substituted or unsubstituted, and wherein hetero atoms may optionally be present in either the aryl portion or the alkyl portion of the arylalkylene group; or (iv) an alkylarylene group, which can be substituted or unsubstituted alkylarylene groups, wherein the alkyl portion of the alkylarylene group can be linear or branched, saturated or unsaturated, cyclic or acyclic, and substituted or unsubstituted, and where hetero atoms may optionally be present in either the aryl portion or the alkyl portion of the alkylarylene group.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. A series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 7,276,614 (Eniko Toma, et al.), which is hereby incorporated by reference herein in its entirety, discloses curable ester-terminated oligoamide compounds and ink compositions containing them. Disclosed are compounds of the formula

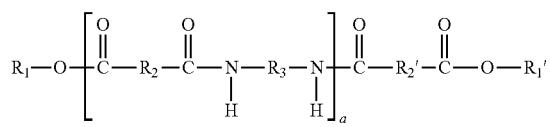

wherein $R_1$ and $R_{1'}$ each, independently of the other, is an alkyl group having at least one ethylenic unsaturation, an arylalkyl group having at least one ethylenic unsaturation, or an alkylaryl group having at least one ethylenic unsaturation, $R_2$, $R_{2'}$, and $R_3$ each, independently of the others, are alkylene groups, arylene groups, arylalkylene groups, or alkylarylene groups, and n is an integer representing the number of repeat amide units and is at least 1.

U.S. Pat. No. 7,279,587 (Peter G. Odell, et al.), which is hereby incorporated by reference herein in its entirety, discloses photoinitiating compounds compatible with or useful in phase change ink compositions. Disclosed are compounds of the formula

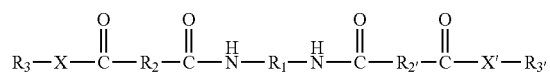

wherein $R_1$ is an alkylene, arylene, arylalkylene, or alkylarylene group, $R_2$ and $R_{2'}$ each, independently of the other, are alkylene, arylene, arylalkylene, or alkylarylene groups, $R_3$ and $R_{3'}$ each, independently of the other, are either (a) photoinitiating groups, or (b) groups which are alkyl, aryl, arylalkyl, or alkylaryl groups, provided that at least one of $R_3$ and $R_{3'}$ is a photoinitiating groups, and X and X' each, independently of the other, is an oxygen atom or a group of the formula —$NR_4$—, wherein $R_4$ is a hydrogen atom, and alkyl group, an aryl group, or an alkylaryl group.

U.S. Pat. No. 5,783,657 (Mark S. Pavlin, et al.), which is hereby incorporated by reference herein in its entirety, discloses low molecular weight, ester-terminated polyamides which may be blended with a liquid hydrocarbon to form a transparent composition having gel consistency. The ester-terminated polyamide is prepared by reacting "x" equivalents of dicarboxylic acid wherein at least 40% of those equivalents are from polymerized fatty acid, "y" equivalents of diamine such s ethylene diamine, and "z" equivalents of monoalcohol having at least 4 carbon atoms. The stoichiometry of the reaction mixture is such that $0.9 \leq \{x/(y+z)\} \leq 1.1$ and $0.1 \leq \{z/(y+z)\} \leq 0.7$. The reactants are heated until they reach reaction equilibrium. The gel contains about 5-50% ester-terminated polyamide, with the remainder preferably being pure hydrocarbon. The gels are useful in formulating personal care products and other articles wherein some degree of gel-like or self-supporting consistency is desired.

U.S. Pat. No. 6,111,055 (Vivian Berger, et al.), which is hereby incorporated by reference herein in its entirety, discloses an ester-terminated dimer acid-based polyamide may be blended with a solvent to form a gel. The solvent may be flammable, and a wick may be added to the resulting gel so as to form a candle.

While known compositions and processes are suitable for their intended purposes, a need remains for improved phase change ink compositions. In addition, a need remains for phase change inks that produce images with improved scratch resistance. Further, a need remains for phase change inks that produce images with improved adhesion to substrates such as paper. There is also a need for ultraviolet curable compounds that can be incorporated into phase change ink carriers without adversely affecting the viscosity characteristics of the ink at desired jetting temperatures. In addition, there is a need for ultraviolet curable compounds that can be incorporated into phase change ink carriers without adversely affecting the melting point of the ink. Additionally, there is a need for ultraviolet curable phase change inks that can be used in ink jet printing processes wherein the ink is jetted directly onto a final substrate such as paper or transparency material. A need also remains for phase change inks that generate images that exhibit improved robustness on the final recording sheet. In addition, a need remains for phase change inks that generate images with improved toughness. Further, a need remains for phase change inks that can be jetted at reduced temperatures. Additionally, a need remains for phase change inks that enable control of dot spread of the ink, particularly in processes wherein the ink is jetted directly onto a final substrate. In addition, there is a need for phase change inks wherein the ink does not bleed excessively into the substrate, particularly in processes wherein the ink is jetted directly onto a final substrate. Further, there is a need for phase change inks wherein the ink does not generate an undesirably high pile height and wherein an unnecessarily high number of drops are needed to create the image, particularly in processes wherein the ink is jetted directly onto a final substrate. Additionally, there is a need for phase change inks wherein the ink generates images with reduced showthrough. A need also remains for phase change inks wherein the increased viscosity of the ink during photoinitiation reduces the rate of diffusion of oxygen and its inhibitory effect in the ink, thereby increasing the efficiency of cure. In addition, a need remains for improved ultraviolet curable phase change ink compositions used in, for example, but not limited to, production printing. Further, there remains a need for an improved phase change ink composition providing wide substrate latitude, excellent adhesion, and enhanced pigment dispersion stability. Further, a need remains for gellant compositions for phase change inks that can provide enhanced spectral transmission and gelation properties. Further, there remains a need for a gellant composition for phase change inks that can be readily produced and that does not require post reaction purification to achieve the desired gellant composition. Further, there remains a need for a gellant that can provide adequate gelation strength without the need for complex processing steps. Further, there remains a need for a gellant that has high thermal stability.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change ink comprising a colorant, an initiator, and a phase change ink carrier, said carrier comprising at least one radically curable monomer compound and a compound of the formula

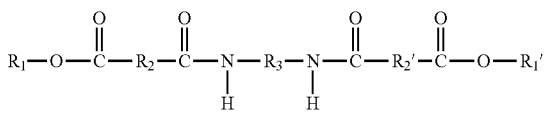

wherein $R_1$ and $R_{1'}$ are the same, and wherein $R_1$ and $R_{1'}$ each are an aromatic group;

wherein $R_2$ and $R_{2'}$ are the same or different, and wherein $R_2$ and $R_{2'}$ are each independently selected from (i) alkylene groups, which can be linear or branched, saturated or unsaturated, cyclic or acyclic, substituted or unsubstituted alkylene groups, and wherein hetero atoms may optionally be present in the alkylene group; (ii) arylene groups, which can be substituted or unsubstituted arylene groups, and wherein hetero atoms may optionally be present in the arylene group; (iii) arylalkylene groups, which can be substituted or unsubstituted arylalkylene groups, wherein the alkyl portion of the arylalkylene group can be linear or branched, saturated or unsaturated, cyclic or acyclic, and substituted or unsubstituted, and wherein hetero atoms may optionally be present in either the aryl portion or the alkyl portion of the arylalkylene group; or (iv) alkylarylene groups, which can be substituted or unsubstituted alkylarylene groups, wherein the alkyl portion of the alkylarylene group can be linear or branched, saturated or unsaturated, cyclic or acyclic, and substituted or unsubstituted, and wherein hetero atoms may optionally be present in either the aryl portion or the alkyl portion of the alkylarylene group; and wherein $R_3$ is (i) a linear or branched alkylene group, which can be saturated or unsaturated, and substituted or unsubstituted alkylene groups, and wherein hetero atoms may optionally be present in the alkylene group; (ii) an arylene group, which can be substituted or unsubstituted arylene groups, and wherein hetero atoms may optionally be present in the arylene group; (iii) an arylalkylene group, which can be substituted or unsubstituted arylalkylene groups, wherein the alkyl portion of the arylalkylene group can be linear or branched, saturated or unsaturated, cyclic or acyclic, and substituted or unsubstituted, and wherein hetero atoms may optionally be present in either the aryl portion or the alkyl portion of the arylalkylene group; or (iv) an alkylarylene group, which can be substituted or unsubstituted alkylarylene groups, wherein the alkyl portion of the alkylarylene group can be linear or branched, saturated or unsaturated, cyclic or acyclic, and substituted or unsubstituted, and where hetero atoms may optionally be present in either the aryl portion or the alkyl portion of the alkylarylene group.

Also described is a phase change ink comprising a colorant, an initiator, and a phase change ink carrier, said carrier comprising at least one radically curable monomer compound and a compound of the formula

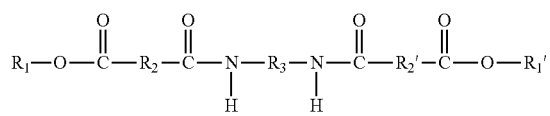

wherein $R_1$ and $R_{1'}$ can be the same or different, and wherein $R_1$ and $R_{1'}$ each, independently of the other is (i) an alkyl group having a least one ethylenic unsaturation therein, which can be linear or branched, cyclic or acyclic, and substituted or unsubstituted alkyl groups, and wherein hetero atoms may optionally be present in the alkyl group, (ii) an arylalkyl group having at least one ethylenic unsaturation therein, which can be substituted or unsubstituted arylalkyl groups, wherein the alkyl portion of arylalkyl group can be linear or branched, cyclic or acyclic, and substituted or unsubstituted, and wherein hetero atoms may optionally be present in either the aryl portion or the alkyl portion of the arylalkyl group, (iii) an alkylaryl group having at least one ethylenic unsaturation therein, which can be substituted or unsubstituted alkylaryl groups, wherein the alkyl portion of the alkylaryl group can be linear or branched, cyclic or acyclic, and substituted or unsubstituted, and wherein hetero atoms may optionally be present in either the aryl or the alkyl portion of the alkylaryl group, or (iv) an aromatic group, provided that at least one of $R_1$ and $R_{1'}$ is an aromatic group; and provided that neither of $R_1$ or $R_{1'}$ is a photoinitiator group;

wherein $R_2$ and $R_{2'}$ are the same or different, and wherein $R_2$ and $R_{2'}$ are each independently selected from (i) alkylene groups, which can be linear or branched, saturated or unsaturated, cyclic or acyclic, substituted or unsubstituted alkylene groups, and wherein hetero atoms may optionally be present in the alkylene group; (ii) arylene groups, which can be substituted or unsubstituted arylene groups, and wherein hetero atoms may optionally be present in the arylene group; (iii) arylalkylene groups, which can be substituted or unsubstituted arylalkylene groups, wherein the alkyl portion of the arylalkylene group can be linear or branched, saturated or unsaturated, cyclic or acyclic, and substituted or unsubstituted, and wherein hetero atoms may optionally be present in either the aryl portion or the alkyl portion of the arylalkylene group; or (iv) alkylarylene groups, which can be substituted or unsubstituted alkylarylene groups, wherein the alkyl portion of the alkylarylene group can be linear or branched, saturated or unsaturated, cyclic or acyclic, and substituted or unsubstituted, and wherein hetero atoms may optionally be present in either the aryl portion or the alkyl portion of the alkylarylene group; and wherein $R_3$ is (i) a linear or branched alkylene group, which can be saturated or unsaturated, and substituted or unsubstituted alkylene groups, and wherein hetero atoms may optionally be present in the alkylene group; (ii) an arylene group, which can be substituted or unsubstituted arylene groups, and wherein hetero atoms may optionally be present in the arylene group; (iii) an arylalkylene group, which can be substituted or unsubstituted arylalkylene groups, wherein the alkyl portion of the arylalkylene group can be linear or branched, saturated or unsaturated, cyclic or acyclic, and substituted or unsubstituted, and wherein hetero atoms may optionally be present in either the aryl portion or the alkyl portion of the arylalkylene group; or (iv) an alkylarylene group, which can be substituted or unsubstituted alkylarylene groups, wherein the alkyl portion of the alkylarylene group can be linear or branched, saturated or unsaturated, cyclic or acyclic, and substituted or unsubstituted, and where hetero atoms may optionally be present in either the aryl portion or the alkyl portion of the alkylarylene group.

DETAILED DESCRIPTION

Described are compounds of the formula

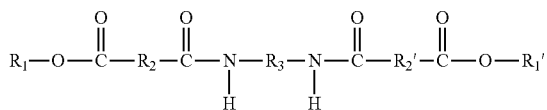

Figure 1:
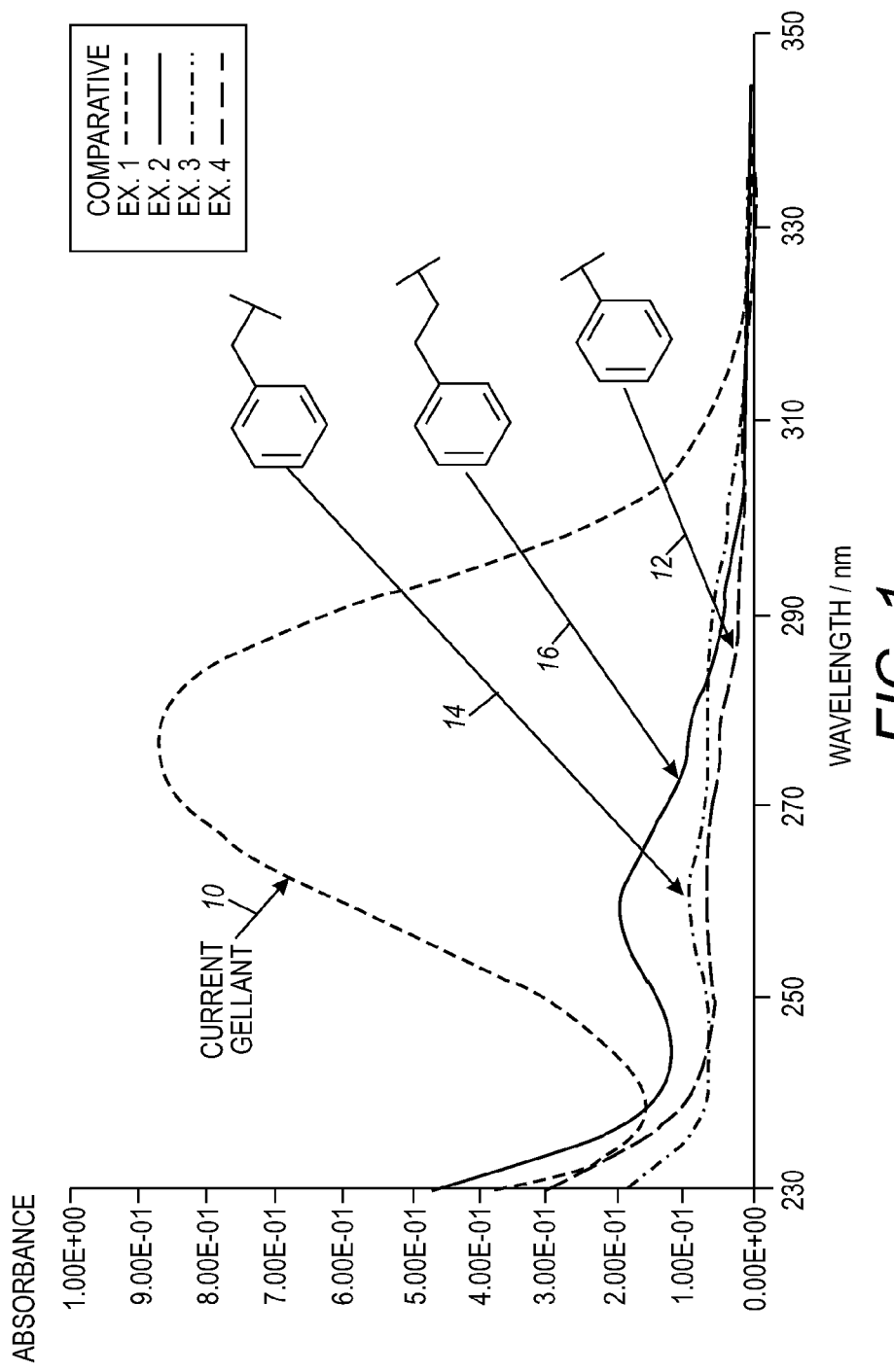
FIG. 1 is a graph showing absorbance (y-axis) versus wavelength (x-axis) for a comparative gellant and for three exemplary gellants of the present disclosure.

wherein $R_1$ and $R_{1'}$ are the same, and wherein $R_1$ and $R_{1'}$ each are an aromatic group.

In embodiments, $R_1$ and $R_{1'}$ are a single species end-capping both ends of the gellant compound which provides a single gellant product, rather than a mixture, thereby eliminating the need for complex post reaction purification and processing. In embodiments, the gellant composition functionalized with identical aromatic end cap molecules provides enhanced spectral transmission and gelation properties. Further, in embodiments, the aromatic end capped gellant compounds have reduced ultraviolet absorbance which enables more efficient ultraviolet cure of a phase change ink prepared with the present gellants and higher ultimate viscosity providing enhanced gelation properties over prior gellant compounds. Still further, in embodiments, $R_1$ and $R_{1'}$ are the same non-reactive end cap molecule thereby providing a gellant compound having high thermal stability. With respect to thermal stability, heating of a conventional gellant overnight in an oven at 85° C. yields a product that is incompletely soluble in monomer. In embodiments herein, gellants with aromatic end-cap functionality are stable for weeks in an oven at 85° C. and the material is freely soluble in monomer. In embodiments, the gellants herein are stable for about 8 weeks in an oven held at 85° C. As used here, stable means that there is no crosslinking or decomposition of the gellant material, and it remains completely soluble in monomer. In embodiments, cleaner product synthesis with fewer side products is provided due to the use of a single end cap species.

In embodiments herein, the compounds herein provide a higher complex viscosity and increased thermal stability over prior known compounds. In certain embodiments, the compounds herein provide a complex viscosity of from about $10^4$ centipoise (cps) to about $10^8$ cps, or from about $10^5$ cps to about $10^7$ cps, or from about $10^5$ cps to about $10^6$ cps at a temperature of from about 10 to about 50° C.

In other embodiments, the compounds herein provide a reduced ultra-violet (UV) wavelength absorbance over previous known compounds which enables a more efficient UV cure of ink containing the present compounds. In certain embodiments, the compounds herein provide an absorbance of from about 0 to about 0.8, or from about 0 to about 0.7, or from about 0 to about 0.6 at a wavelength of from about 230 to about 400 nanometers. See, for example, FIG. 1, wherein the absorbance for a current gellant (Comparative Example 1) at 275 nanometers is about 8.5E-01 and the absorbance for gellants as disclosed herein at 275 nanometers is about 0.5E-01 (Example 4), about 0.75E-01 (Example 3) and about 1.00E-01 (Example 2).

In embodiments, $R_1$ and $R_{1'}$ are the same and are selected from the following aromatic groups:

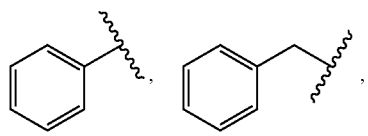

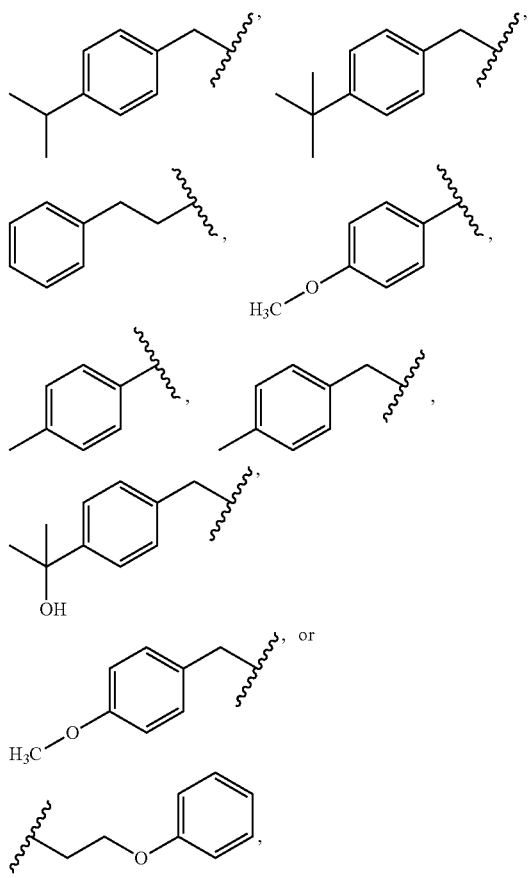

wherein ～ represents the point of attachment of the $R_1$ and $R_{1'}$ group.

In other embodiments, $R_1$ and $R_{1'}$ are the same and are selected from the formula

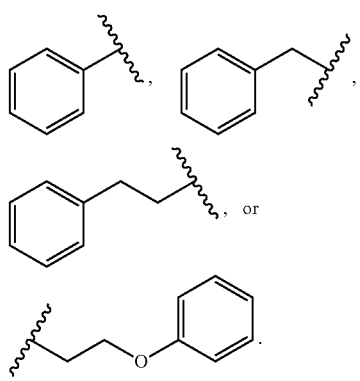

In one specific embodiment, $R_1$ and $R_{1'}$ are each of the formula

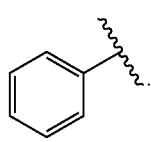 [SMILES: *c1ccccc1]

In another specific embodiment, $R_1$ and $R_{1'}$ are each of the formula

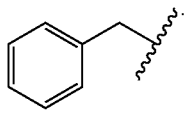 [SMILES: *Cc1ccccc1]

In yet another specific embodiment, $R_1$ and $R_{1'}$ are each of the formula

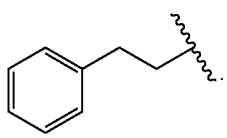 [SMILES: *CCc1ccccc1]

In still another specific embodiment, $R_1$ and $R_{1'}$ are each of the formula

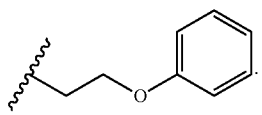 [SMILES: *CCOc1ccccc1]

$R_2$ and $R_{2'}$ are each, independently of the other:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein hetero atoms such as oxygen, nitrogen, sulfur, silicon, phosphorus, boron, and the like, may optionally be present in the alkylene group), in embodiments, having from about 2 to about 100 carbon atoms, in embodiments having at least about 2, 4, 6, 8, 10, 12, 14, 16, 18, 20, 22, 24, 26, 28, 30, 32, 34, or 36 carbon atoms, or no more than about 100, no more than about 60, or no more than about 50 carbon atoms, and in a specific embodiment, about 36 carbon atoms, although the numbers can be outside of these ranges.

(ii) arylene groups (wherein an arylene group is defined as a divalent aromatic or aryl group, including substituted and unsubstituted arylene groups, and wherein hetero atoms such as described above for the alkylene groups may optionally be present in the arylene group), in embodiments, having from about 5 to about 100 carbon atoms, in embodiments at least about 5 or 6 carbon atoms, or no more than about 100, no more than about 60, or no more than about 50 carbon atoms, although the numbers can be outside of these ranges, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, cyclic or acyclic, and substituted or unsubstituted, and wherein hetero atoms such as described above for the alkylene groups may optionally be present in either the aryl portion of the alkyl portion of the arylalkylene group), in embodiments, having from about 6 to about 100 carbon atoms, in embodiments having at least about 6 or 7 carbon atoms, or nor more than about 100, no more than about 60, or no more than about 50 carbon atoms, although the numbers can be outside of these ranges, (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, cyclic or acyclic, and substituted or unsubstituted, and wherein hetero atoms such as described above for the alkylene groups may optionally be present in either the aryl portion or the alkyl portion of the alkylarylene group), in embodiments, having from about 6 to about 100 carbon atoms, in embodiments having at least 6 or 7 carbon atoms, or no more than about 100, no more than about 60, or no more than about 50 carbon atoms, although the numbers can be outside of these ranges, wherein the substituents on the substituted alkylene, arylene, arylalkylene, and alkylarylene groups can be, but are not limited to, the following groups: pyridine, pyridinium, ether, aldehyde, ketone, ester, amide, carbonyl, thiocarbonyl, sulfide, phosphine, phosphonium, phosphate, nitrile, mercapto, nitro, nitroso, acyl, acid anhydride, azide, azo, thiocyanato, carboxylate, urethane, urea, mixtures and combinations thereof, and the like, wherein two or more substituents can be joined together to form a ring.

In embodiments, $R_2$ and $R_{2'}$ are both alkylene groups, which can be linear or branched, saturated or unsaturated, cyclic or acyclic, and substituted alkylene groups, and hetero atoms may optionally be present in the alkylene group. In some embodiments, $R_2$ and $R_{2'}$ are both saturated alkylene groups. In other embodiments, $R_2$ and $R_{2'}$ are both unsubstituted alkylene groups. In some embodiments, $R_2$ and $R_{2'}$ are each groups of the formula

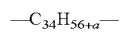

$-C_{34}H_{56+a}-$ and are branched alkylene groups which may include unsaturations and cyclic groups, and wherein a is an integer of 0, 1, 2, 3, 4, 5, 6, 7, 8, 9, 10, 11, or 12. In specific embodiments, $R_2$ and $R_{2'}$ include isomers of the formula

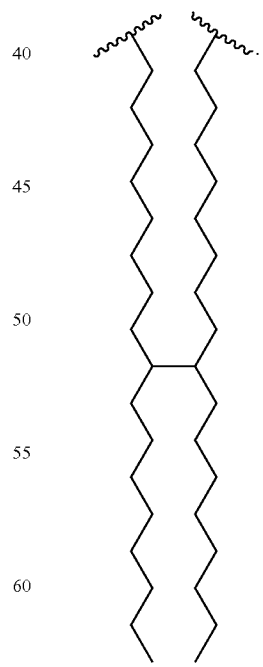

$R_3$ is
(i) an alkylene group (wherein an alkylene group is defined as a divalent aliphatic group or alkyl group, including linear and branched, saturated and unsaturated, cyclic and acyclic, and substituted and unsubstituted alkylene groups, and wherein hetero atoms as described for the $R_2$ and $R_{2'}$ alkylene groups may optionally be present in the alkylene group), in embodiments, having from about 2 to about 80 carbon atoms, in embodiments, having at least about 2 carbon atoms, or no more than about 80, 60, or 50, or 36 carbon atoms, although the numbers of carbon atoms can be outside of these ranges, (ii) an arylene group (wherein an arylene group is defined as a divalent aromatic group or aryl group, including substituted and unsubstituted arylene groups, and wherein hetero atoms as described for the $R_3$ alkylene group may optionally be present in the arylene group), in embodiments, having from about 2 to about 50 carbon atoms, in embodiments about 2 carbon atoms, in embodiments having no more than about 5, or 6 carbon atoms, or no more than about 50, 25, or 18 carbon atoms, although the numbers of carbon atoms can be outside of these ranges, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, cyclic or acyclic, and substituted or unsubstituted, and wherein hetero atoms as described for the $R_3$ alkylene group may optionally be present in the either the aryl portion or the alkyl portion of the arylalkylene group), in embodiments, having from about 6 to about 50 carbon atoms, in embodiments having at least about 6 or 7 carbon atoms, or no more than about 50, 36, or 18 carbon atoms, although the numbers of carbon atoms can be outside of these ranges, (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, cyclic or acyclic, and substituted or unsubstituted, and wherein hetero atoms as described for the $R_3$ alkylene group may optionally be present in either the aryl portion or the alkyl portion of the alkylarylene group), in embodiments, having from about 6 to about 50 carbon atoms, in embodiments, having at least about 6 or 7 carbon atoms, or no more than about 50, 36, or 18 carbon atoms, although the numbers of carbon atoms can be outside of these ranges, wherein the substituents on the substituted alkylene, arylene, arylalkylene, and alkylarylene groups can be, but are not limited to, the following groups: pyridine, pyridinium, ether, aldehyde, ketone, ester, amide, carbonyl, thiocarbonyl, sulfide, phosphine, phosphonium, phosphate, nitrile, mercapto, nitro, nitroso, acyl, acid anhydride, azide, azo, carboxylate, urethane, urea, mixtures and combinations thereof, and the like, wherein two or more substituents can be joined together to form a ring.

In embodiments, $R_3$ is a linear or branched alkylene group, which can be saturated or unsaturated, substituted or unsubstituted alkylene groups, and wherein hetero atoms may optionally be present in the alkylene group. In a specific embodiment, $R_3$ is an ethylene group

—CH$_2$CH$_2$—.

In specific embodiments, the gellant compound is of the formula

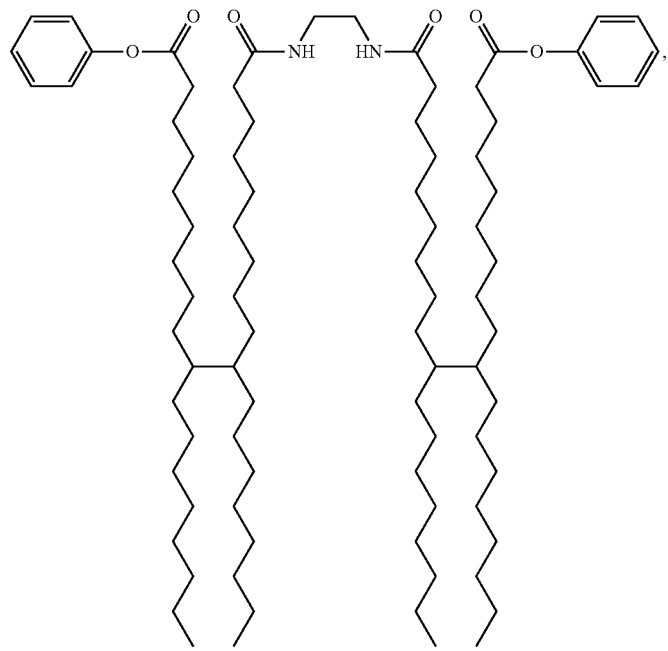

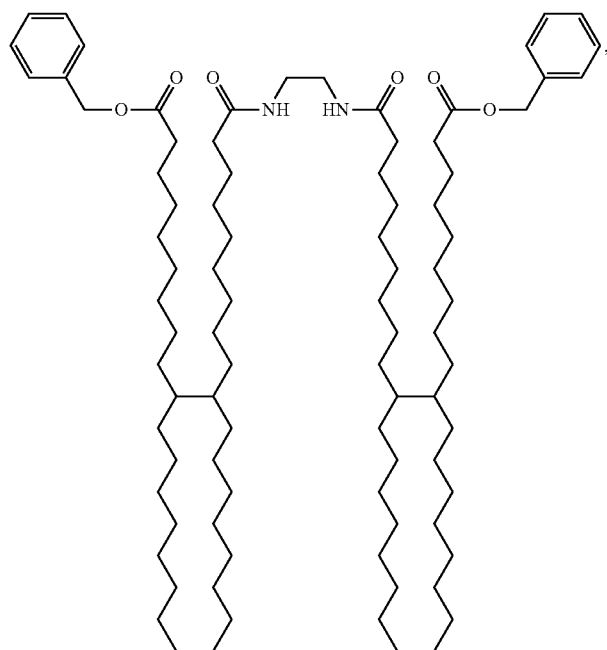
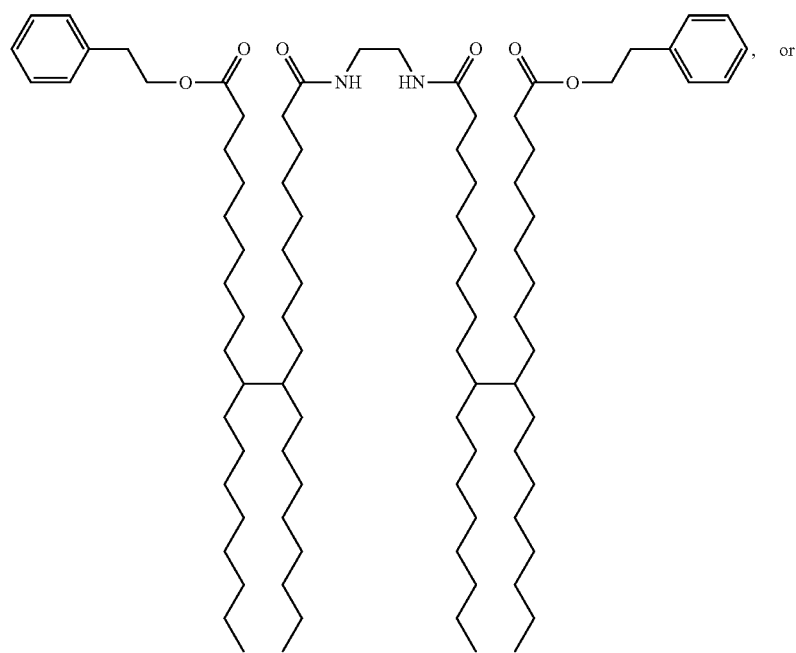

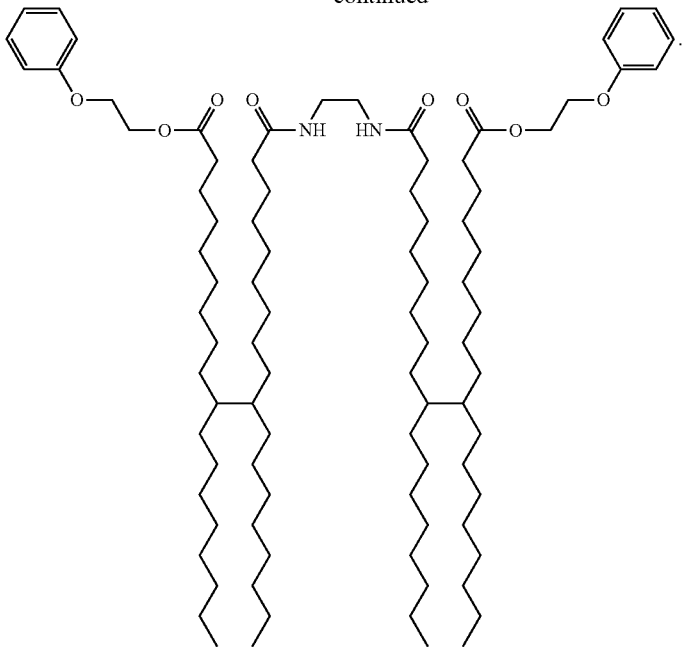

In an alternate embodiment, a compound of the formula

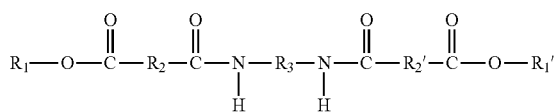

is disclosed wherein $R_2$, $R_{2'}$ and $R_3$ are as described above, and wherein $R_1$ and $R_{1'}$ can be the same or different, provided that at least one of $R_1$ and $R_{1'}$ is an aromatic group; and provided that neither of $R_1$ or $R_{1'}$ is a photoinitiator group.

In this embodiment, at least one of $R_1$ and $R_{1'}$ is an aromatic end cap comprising an aromatic group, as described herein and the other of $R_1$ or $R_{1'}$ is:

(i) an alkyl group having a least one ethylenic unsaturation therein which (including linear and branched, cyclic and acyclic, and substituted and unsubstituted alkyl groups, and wherein hetero atoms such as oxygen, nitrogen, sulfur, silicon, phosphorus, boron, and the like, may optionally be present in the alkyl group, in embodiments, having from about 2 to about 100 carbon atoms, in embodiments, having at least about 2, 3, or 4 carbon atoms, or no more than about 100, 60, or 30 carbon atoms, although the number of carbon atoms can be outside of these ranges, (ii) an arylalkyl group having at least one ethylenic unsaturation therein (including substituted and unsubstituted arylalkyl groups, wherein the alkyl portion of arylalkyl group can be linear or branched, cyclic or acyclic, and substituted or unsubstituted, and wherein hetero atoms as described above for the alkyl group may optionally be present in either the aryl portion or the alkyl portion of the arylalkyl group), in embodiments, having from about 6 to about 100 carbon atoms, in embodiments, having at least about 6 or 7 carbon atoms, or no more than about 100, 60, or 30 carbon atoms, although the number of carbon atoms can be outside of these ranges, (iii) an alkylaryl group having at least one ethylenic unsaturation therein (including substituted or unsubstituted alkylaryl groups, wherein the alkyl portion of the alkylaryl group can be linear or branched, cyclic or acyclic, and substituted or unsubstituted, and wherein hetero atoms as described above for the alkyl group may optionally be present in either the aryl portion or the alkyl portion of the alkylaryl group, in embodiments, having about 6 to about 100 carbon atoms, in embodiments, having at least about 6 or 7 carbon atoms, or not more than about 100, 60, or 30 carbon atoms, although the number of carbon atoms can be outside of these ranges, such as tolyl or the like, wherein the substituents on the substituted alkyl, arylalkyl, and alkylaryl groups can be, but are not limited to, halogen atoms and the following groups: ether, aldehyde, ketone, ester, amide, carbonyl, thiocarbonyl, sulfate, sulfonate, sulfonic acid, sulfide, sulfoxide, phosphine, phosphonium, phosphate, nitrile, mercapto, nitro, nitroso, sulfone, acyl, acid anhydride, azide, azo, cyanato, isocyanato, thiocyanato, isothiocyanato, carboxylate, carboxylic acid, urethane, urea, mixtures and combinations thereof, and the like, wherein two or more substituents can be joined together to form a ring.

In embodiments, one of $R_1$ or $R_{1'}$ is of the formula

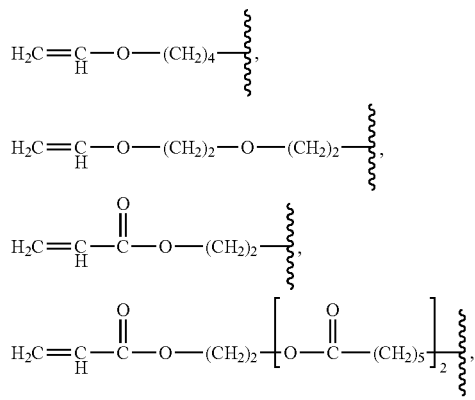

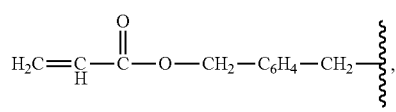
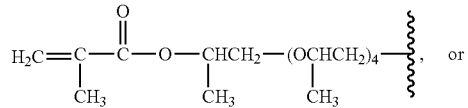
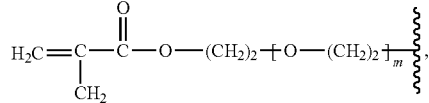
wherein m is an integer representing the number of repeating (O—$CH_2$)$_2$ units. In embodiments, m is an integer of from about 1 to about 10, although not limited.
In specific embodiments, the gellant compound is of the formula
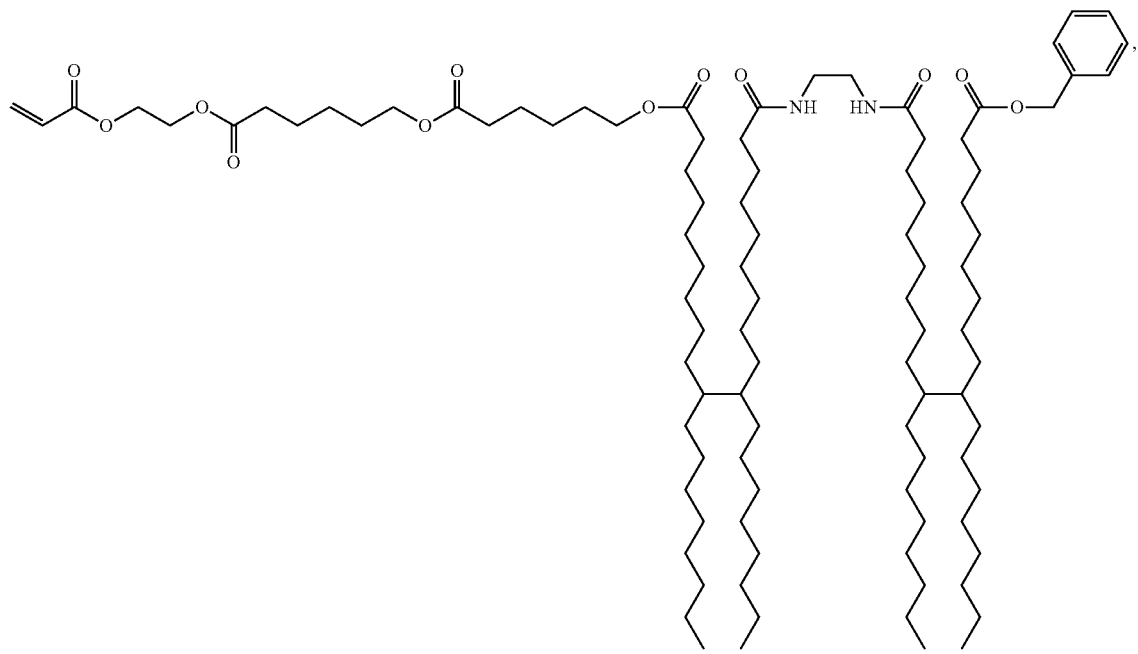
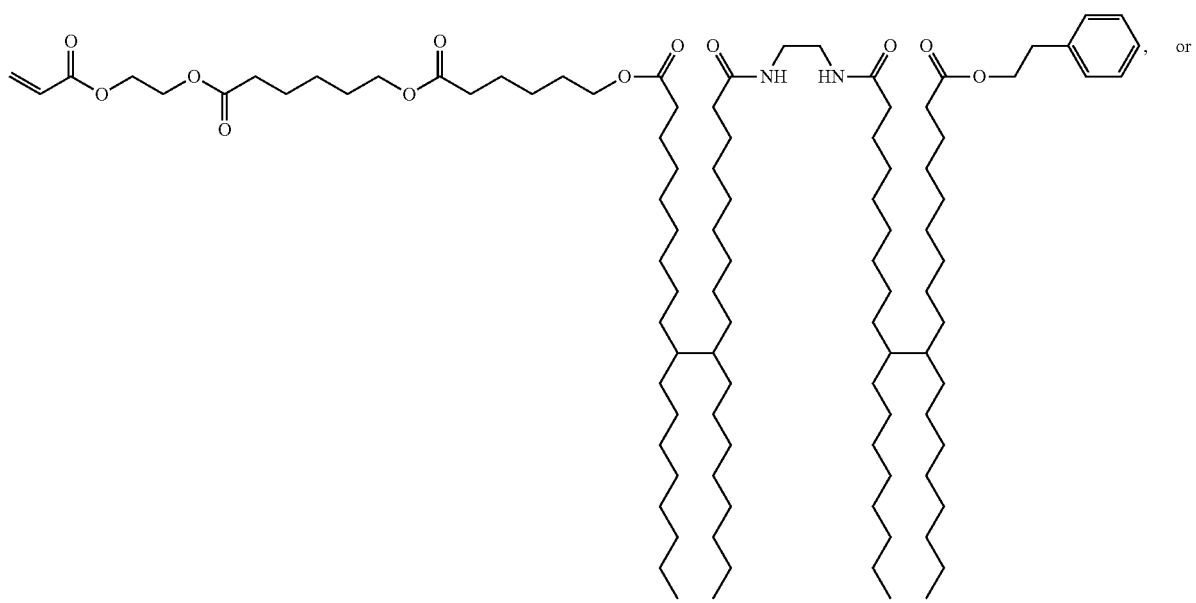

-continued

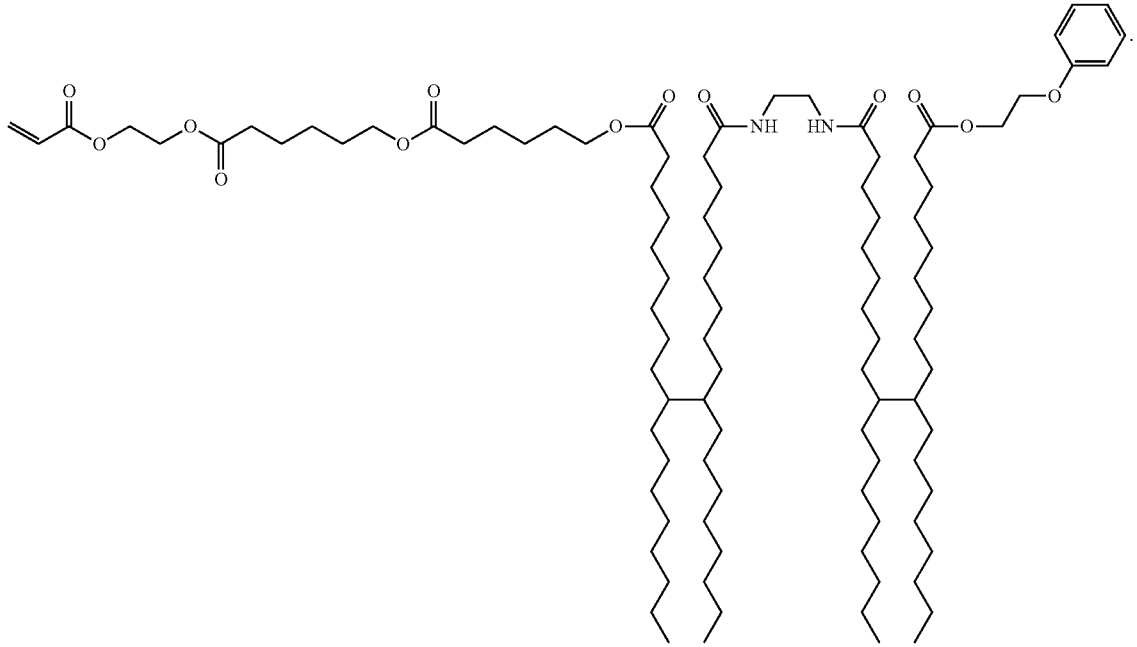 [SMILES: C=CC(=O)OCCOC(=O)CCCCCOC(=O)CCCCCOC(=O)CCCCCCCCC(CCCCCCCC)C(CCCCCCCC)CCCCCCCCC(=O)NCCNC(=O)CCCCCCCCC(CCCCCCCC)C(CCCCCCCC)CCCCCCCCC(=O)OCCOc1ccccc1]

Compounds as disclosed herein can be prepared by any desired or effective method. For example, in one specific embodiment, about 2 molar equivalents of a diacid of the formula

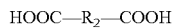
HOOC—R$_2$—COOH and about one molar equivalent of a diamine of the formula

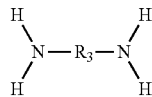

can be reacted by use of a coupling agent such as 1,3-dicylclohexylcarbodimide (DCC) in the present of a catalyst such as 4-dimethylaminopyridine (DMAP) in the presence of a solvent such as methylene chloride (CH$_2$Cl$_2$) at reduced temperatures followed by eventual warming to about room temperature to produce an organoamide intermediate.

The diacid and the diamine can be present in any desired or effective relative amounts. In embodiments, at least about 1.75 moles of diacid per every 1 mole of diamine, or at least about 2 moles of diacid per every 1 mole of diamine, or no more than about 2.5 moles of diacid per every 1 mole of diamine, or no more than about 2.3 moles of diacid per every 1 mole of diamine, or no more than about 2.1 moles of diacid per every 1 mole of diamine, although the relative amounts can be outside of these ranges.

In one embodiment, to the resulting reaction mixture containing the organoamide intermediate can be added about two molar equivalents of an identical aromatic end cap molecule having the formula

R$_1$—OH.

In another embodiment, to the resulting reaction mixture containing the organoamide intermediate can be added about one molar equivalent of a first end cap molecule which is an aromatic alcohol having the formula

R$_1$—OH as described herein and about one molar equivalent of a second end cap molecule which is an alkyl group having at least one ethylenic unsaturation, an arylalkyl group having at least one ethylenic unsaturation, or an alkylaryl group having at least one ethylenic unsaturation, as described herein. In a specific embodiment, the second end cap molecule is caprolactone acrylate.

The organoamide intermediate and the aromatic alcohol can be present in any desired or effective relative amounts. For example, wherein R$_1$ and R$_1'$ are the same and comprise an aromatic alcohol, in one embodiment, at least about 1.75 moles of aromatic alcohol per every 1 mole of organoamide intermediate, or at least about 2 moles of aromatic alcohol per every 1 mole of organoamide intermediate, or at least about 2.25 moles of aromatic alcohol per eveyr 1 mole of organoamide intermediate, or no more than about 3 moles of aromatic alcohol per every 1 mole of organoamide intermediate, or no more than about 2.75 moles of aromatic alcohol per every 1 mole of organoamide intermediate, or no more than about 2.5 moles of aromatic alcohol per every 1 mole of organoamide intermediate, although the relative amounts can be outside of these ranges. In embodiments wherein R$_1$ and R$_1'$ are two different species, the combined total amount of R$_1$ and R$_1'$ is, in embodiments, at least about 1.75, 2, 2.25 moles per every 1 mole of organoamide intermediate, or no more than about 2.75 or no more than about 2.5 moles (combined total of R$_1$ and R$_1'$), although the relative amounts can be outside of these ranges.

The ingredients can be mixed together in the sequence just described and a one pot reaction can be employed. For example, molten organoamide intermediate can be added to a 1 liter round bottomed flask equipped with a magnetic stir bar, followed by dichloromethane solvent with stirring until the organoamide intermediate is completely dissolved to form a clear, golden solution. A catalyst, such as DMAP, can be added, followed by a coupling agent, such as DCC.

Next, in one embodiment, a single species of end cap molecule can be added to the reaction mixture containing the organoamide intermediate.

Alternately, in another embodiment, a first species of end cap molecule being an aromatic alcohol and a second species of end cap molecule that is different from the aromatic alcohol can be added simultaneously to the reaction mixture.

The reaction mixture containing the organoamide intermediate or and the single end cap component or the mixed end cap components can be allowed to stir overnight at room temperature. The reaction contents can then be filtered to remove N,N-dicyclohexylurea (DCHU) by-product. The filtrate can be concentrated on a rotary evaporator resulting in a golden gel-like solid amide gellant. The solid residue can be dried in a vacuum oven, such as for about 2 hours at about 90° C., to remove residual solvent from the amide gellant.

Examples of suitable coupling agents include 1,3-dicyclohexylcarbodiimide (DCC) of the formula

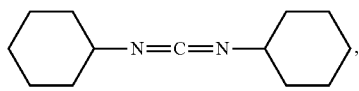

1-(3-(dimethylamino)propyl)3-ethylcarbodiimide HCl (EDCl), N,N-carbonyldiimidazole, N-cyclohexyl-N'-(2-morpholinoethyl)-carbodiimide methyl-p-toluenesulfonate, (benzotriazol-1-yloxy)tris(dimethylamino)phosphonium hexafluorophosphate (BOP), (o-benzotriazol-1-yl)-N,N,N', N'-bis(tetramethylene(uranium hexafluorophosphate (HBTU), bis(2-oxo-3-oxazolidinyl)phosphonic chloride (BOP-Cl), (1H-1,2,3-benzotriazol-1-yloxy)tris(pyrrolidino) phosphonium hexafluoro phosphate (PyBOP), and the like, and mixtures and combinations thereof.

The coupling agent and the diacid can be present in any desired or effective relative amounts. In embodiments, the coupling agent and the diacid are present in an amount of at least about 1.8 moles of coupling agent per every 1 mole of diacid, or at least about 1.9 moles of coupling agent per every 1 mole of diacid, or at least about 2 moles of coupling agent per every 1 mole of diacid, or no more than about 2.75 moles of coupling agent per every 1 mole of diacid, or no more than about 2.5 moles of coupling agent per every 1 mole of diacid, or no more than about 2.2 moles of coupling agent per every 1 mole of diacid, although the relative amounts can be outside of these ranges.

Examples of suitable catalysts include 4-dimethylaminopyridine (DMAP), of the formula

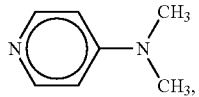

triethylamine, 1,8-diazabicyclo(4a.4.)undec-7-ene (DBU), and the like, and mixtures and combinations thereof.

The catalyst and the diacid are present in any desired or effective relative amounts. In embodiments, the catalyst and the diacid are present in an amount of at least about 0.05 mole of catalyst per every 1 mole of diacid, or at least about 0.1 mole of catalyst per every 1 mole of diacid, or at least about 0.2 mole of catalyst per every 1 mole of diacid, or no more than about 1 mole of catalyst per every 1 mole of diacid, or no more than about 0.8 mole of catalyst per every 1 mole of diacid, or no more than about 0.5 mole of catalyst per every 1 mole of diacid, although the relative amounts can be outside of these ranges.

Any desired or effective solvent can be employed. Examples of suitable solvents include methylene chloride, tetrahydrofuran, methyl ethyl ketone, toluene, dimethyl formamide, diethyl ether, hexane, ethyl acetate, and the like, and mixtures and combinations thereof.

The solvent can be present in any desired or effective amount. In embodiments the solvent can be present in an amount of at least about 10 milliliters of solvent per milimole of diacid, or at least about 15 milliliters of solvent per milimole of diacid, or at least about 20 milliliters of solvent per milimole of diacid, or no more than about 50 milliliters of solvent per milimole of diacid, or no more than about 40 milliliters of solvent per milimole of diacid, or no more than about 30 milliliters of solvent per milimole of diacid, although the amount of solvent can be outside of these ranges.

The reaction between the diacid, the diamine, and the coupling agent can be carried out at any desired or effective temperature, such as from at least about 0° C. to no more than about 50° C., or from about 5° C. to about 40° C., or from about 15° C. to about 30° C., although the temperature can be outside of these ranges.

The subsequent reaction between the resulting amine-terminated diamide intermediate and the additional diacid can be carried out at any desired or effective temperature, such as from at least about 0° C. to no more than about 50° C., or from about 5° C. to about 40° C., or from about 15° C. to about 30° C., although the temperature can be outside of these ranges.

The subsequent reaction between the resulting organoamide intermediate intermediate and the aromatic alcohol can be carried out at any desired or effective temperature, such as from at least about 15° C. to no more than about 40° C., or from about 20° C. to about 35° C., or from about 25° C. to about 30° C., although the temperature can be outside of these ranges.

The reaction between the diacid and the diamine can be carried out for any desired or effective period of time, such as for about 2 to about 5 hours, although the period of time can be outside of this range.

The reaction between the organoamide intermediate and the aromatic alcohol, or mixture of aromatic alcohol and second end cap molecule, can be carried out for any desired or effective period of time, such as from about 1.5 hours to about 12 hours, or from about 2 to about 5 hours, or from about 2.5 to about 4 hours, although the period of time can be outside of these ranges.

Subsequent to completion of the reaction, the product can be recovered by any desired or effective method, such as filtration of any solid by-products or washing the solution with water depending on the coupling agent used. The solvent can be removed by rotary evaporation. If needed, the product can be purified by washing with acetone and dried in a vacuum oven.

Compounds as disclosed herein can also be prepared by first reacting about n+1 molar equivalents of a diacid of the formula

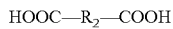

and about n molar equivalent of a diamine of the formula

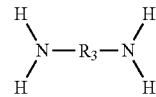

under neat conditions (i.e., in the absence of a solvent) at elevated temperatures while removing water from the reaction mixture to form an acid-terminated organoamide of the formula

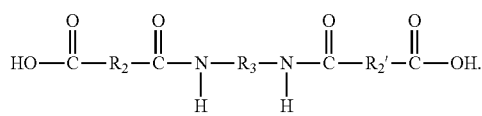

Thereafter, the acid-terminated oligoamide thus formed is reacted with about 2 molar equivalents of an aromatic alcohol of the formula

or the acid-terminated organoamide thus formed is reacted with about 1 molar equivalent of an aromatic alcohol of the formula

and about 1 molar equivalent of a second end cap molecule which is an alkyl group having at least one ethylenic unsaturation, an arylalkyl group having at least one ethylenic unsaturation, or an alkylaryl group having at least one ethylenic unsaturation, as described herein, by use of a coupling agent such as DCC in the presence of a catalyst such as DMAP in the presence of a solvent such as methylene chloride at reduced temperatures.

The reaction proceeds as follows:

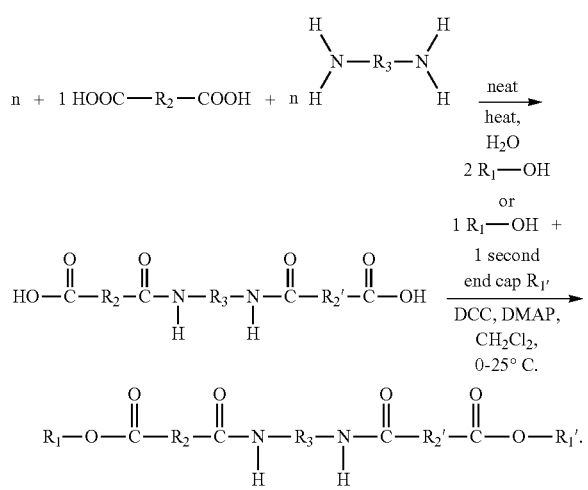

Water can be removed from the reaction mixture between the diacid and the diamine by any desired or effective method, such as by a Dean-Stark trap, molecular sieves, or other dryings agents, or the like.

The reaction between the diacid and the diamine generally is run neat, that is, in the absence of a solvent.

The reaction between the diacid and the diamine can be carried out at any desired effective temperature, such as from about 130° C. to about 180° C., or from about 140° C. to about 175° C., or from about 155° C. to about 165° C., although the temperature can be outside of these ranges.

The reaction between the diacid and the diamine can be carried out for any desired or effective period of time, such as for about 2 to about 5 hours, or from about 2.5 to about 4.5 hours, or from about 3 to about 4 hours, although the period of time can be outside of these ranges.

Thereafter, the acid-terminated organoamide intermediate and the aromatic alcohol (or mixture of aromatic alcohol and second end cap component) are reacted in the presence of a coupling agent and a catalyst.

Suitable coupling agents include those described above, such as DCC. Suitable catalysts include those described above, such as DMAP.

The acid-terminated organoamide intermediate and the aromatic alcohol (or combined total of aromatic alcohol and second end cap component) can be present in any desired or effective relative amounts, in embodiments at least 2 moles of aromatic alcohol per every 1 mole of organoamide intermediate, or no more than about 2.75 moles of aromatic alcohol per every 1 mole of organoamide intermediate, although the relative amounts can be outside of these ranges.

The acid-terminated organoamide intermediate and the coupling agent can be present in any desired or effect relative amounts, in embodiments at least about 1.8 moles of coupling agent per every 1 mole of organoamide intermediate, or no more than about 3 moles of coupling agent per every 1 mole of organoamide intermediate, although the relative amounts can be outside of these ranges.

The catalyst and the organoamide intermediate can be present in any desired or effect relative amounts, in embodiments at least about 0.05 moles of catalyst per every 1 mole of organoamide intermediate, or no more than about 0.8 moles of catalyst per every 1 mole of organoamide intermediate, although the relative amounts can be outside of these ranges.

Any desired or effective solvent can be employed including the solvents described above.

The solvent can be present in any desired or effect relative amounts, in embodiments at least about 20 milliliters of solvent per gram of organoamide intermediate, or no more than about 100 milliliters of solvent per gram of organoamide intermediate, although the amount of solvent can be outside of these ranges.

The reaction between the organoamide intermediate, the aromatic alcohol (or aromatic alcohol and second end cap component), and the coupling agent can be carried out at any desired or effective temperature, such as at least about 15° C. to about 50° C., or from about 20° C. to about 40° C., or from about 25° C. to about 35° C., although the temperature can be outside of these ranges.

The reaction between the acid-terminated organoamide intermediate, the aromatic alcohol (or aromatic alcohol and second end cap component), can be carried out for any desired or effective period of time, such as from about 2 hours to about 12 hours, or from about 2 to about 5 hours, or from about 2.5 to about 4 hours, although the period of time can be outside of these ranges.

Subsequent to completion of the reaction, the product can be recovered by any desired or effective method, such as filtration of any solid by-products or washing the solution with water depending on the coupling agent used. The solvent can be removed by rotary evaporation. If needed, the product can be purified by washing with acetone and dried in a vacuum oven.

Many embodiments of the compounds thus prepared can exhibit gel-like behavior when present in solutions. Examples of materials in which the present compounds can be dissolved include curable monomers such as, for example, propoxylated neopentyl glycol diacrylate, such as SR9003®, commercially available from Sartomer Co. Inc. By gel-like behavior is meant that they undergo a relatively sharp increase in viscosity over a relatively narrow temperature range. In embodiments, some compounds as disclosed herein undergo a change in viscosity of at least about $10^3$ centipoise, at least about $10^5$ centipoise, or at least about $10^6$ centipoise, over a temperature range of at least about 5° C., at least about 10° C., or at least about 30° C., although the viscosity change and the temperature range can be outside of these ranges, and compounds that do not undergo changes within these ranges are also included herein.

At least some embodiments of the compounds disclosed herein can form a semi-solid gel at a first temperature. For example, when the compound is incorporated into a phase change ink, this temperature is below the specific temperature at which the ink is jetted. The semi-solid gel phase is a physical gel that exists as a dynamic equilibrium comprising one or more solid gellant molecules and a liquid solvent. The semi-solid gel phase is a dynamic networked assembly of molecular components held together by non-covalent interactions such as hydrogen bonding, van der Waals interactions, aromatic non-bonding interactions, ionic or coordination bonding, London dispersion forces, or the like, which, upon stimulation by physical forces, such as temperature, mechanical agitation, or the like, or chemical forces such as pH, ionic strength, or the like, can undergo reversible transitions from liquid to semi-solid state at the macroscopic level. The solutions containing the gellant molecules exhibit a thermally reversible transition between the semi-solid gel state and the liquid state when the temperature is varied above or below the gel point of the solution. This reversible cycle of transitioning between semi-solid gel phase and liquid phase can be repeated many times in the solution formulation.

In embodiments, the compounds disclosed herein are curable. "Curable" as used herein means polymerizable or chain extendable, that is, a material that can be cured via polymerization, including, but not limited to, free radical polymerization or chain extension, cationic polymerization or chain extension, and/or in which polymerization is photoinitiated through use of a radiation sensitive photoinitiator. Radiation curable as used herein is intended to cover all forms of curing upon exposure to a radiation source, including, but not limited to, light and heat sources and including in the presence or absence of initiators. Examples of radiation curing include, but are not limited to, ultraviolet (UV) light, for example having a wavelength of from about 200 to about 400 nanometers, visible light, or the like, optionally in the presence of photoinitiators and/or sensitizers, electron-beam radiation, optionally in the presence photoinitiators, thermal curing, optionally in the presence of high temperature thermal initiators (and which are in selected embodiments largely inactive at the jetting temperature when used in phase change inks), and appropriate combinations thereof.

Also described herein is a phase change ink comprising a colorant, an initiator, and a phase change ink carrier, said carrier comprising a compound of the formula

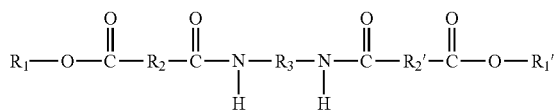

wherein $R_1$ and $R_{1'}$ are the same, and wherein $R_1$ and $R_{1'}$ are each an aromatic group; or wherein $R_1$ and $R_{1'}$ can be the same or different, and wherein $R_1$ and $R_{1'}$ each, independently of the other is (i) an alkyl group having a least one ethylenic unsaturation therein, which can be linear or branched, cyclic or acyclic, and substituted or unsubstituted alkyl groups, and wherein hetero atoms may optionally be present in the alkyl group, (ii) an arylalkyl group having at least one ethylenic unsaturation therein, which can be substituted or unsubstituted arylalkyl groups, wherein the alkyl portion of arylalkyl group can be linear or branched, cyclic or acyclic, and substituted or unsubstituted, and wherein hetero atoms may optionally be present in either the aryl portion or the alkyl portion of the arylalkyl group, (iii) an alkylaryl group having at least one ethylenic unsaturation therein, which can be substituted or unsubstituted alkylaryl groups, wherein the alkyl portion of the alkylaryl group can be linear or branched, cyclic or acyclic, and substituted or unsubstituted, and wherein hetero atoms may optionally be present in either the aryl or the alkyl portion of the alkylaryl group, or (iv) an aromatic group, provided that at least one of $R_1$ and $R_{1'}$ is an aromatic group; and provided that neither of $R_1$ or $R_{1'}$ is a photoinitiator group;

wherein $R_2$ and $R_{2'}$ are the same or different, and wherein $R_2$ and $R_{2'}$ are each independently selected from (i) alkylene groups, which can be linear or branched, saturated or unsaturated, cyclic or acyclic, substituted or unsubstituted alkylene groups, and wherein hetero atoms may optionally be present in the alkylene group; (ii) arylene groups, which can be substituted or unsubstituted arylene groups, and wherein hetero atoms may optionally be present in the arylene group; (iii) arylalkylene groups, which can be substituted or unsubstituted arylalkylene groups, wherein the alkyl portion of the arylalkylene group can be linear or branched, saturated or unsaturated, cyclic or acyclic, and substituted or unsubstituted, and wherein hetero atoms may optionally be present in either the aryl portion or the alkyl portion of the arylalkylene group; or (iv) alkylarylene groups, which can be substituted or unsubstituted alkylarylene groups, wherein the alkyl portion of the alkylarylene group can be linear or branched, saturated or unsaturated, cyclic or acyclic, and substituted or unsubstituted, and wherein hetero atoms may optionally be present in either the aryl portion or the alkyl portion of the alkylarylene group; and wherein $R_3$ is (i) a linear or branched alkylene group, which can be saturated or unsaturated, and substituted or unsubstituted alkylene groups, and wherein hetero atoms may optionally be present in the alkylene group; (ii) an arylene group, which can be substituted or unsubstituted arylene groups, and wherein hetero atoms may optionally be present in the arylene group; (iii) an arylalkylene group, which can be substituted or unsubstituted arylalkylene groups, wherein the alkyl portion of the arylalkylene group can be linear or branched, saturated or unsaturated, cyclic or acyclic, and substituted or unsubstituted, and wherein hetero atoms may optionally be present in either the aryl portion or the alkyl portion of the arylalkylene group; or (iv) an alkylarylene group, which can be substituted or unsubstituted alkylarylene groups, wherein the alkyl portion of the alkylarylene group can be linear or branched, saturated or unsaturated, cyclic or acyclic, and substituted or unsubstituted, and where hetero atoms may optionally be present in either the aryl portion or the alkyl portion of the alkylarylene group.

The compound of the formula

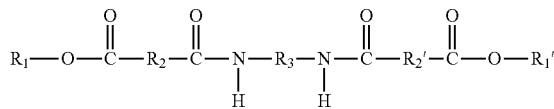

Is present in the phase change ink in any desired or effective amount, such as from about 5 to about 50 percent by weight of the ink carrier, or from about 7.5 to about 40 percent by weight of the ink carrier, or from about 10 to about 30 percent by weight of the ink carrier, although the amount can be outside of these ranges.

The compounds discloses herein can, in at least some embodiments, act as an organic gellant in the ink to control the viscosity of the ink within a desired temperature range. In particular, the gellant can, in some embodiments, form a semi-solid gel in the ink vehicle at temperatures below the specific temperature at which the ink is jetted.

The ink vehicle further contains at least one radically curable monomer compound. Examples of suitable monomer compounds include, but are not limited, propoxylated neopentyl diacrylate, such as SR9003®, commercially available from Sartomer Co. Inc., isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include, but are not limited to, pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, hexanediol diacrylate, tripropylene glycol diacrylate, dipropylene glycol diacrylate, amine modified polyether acrylates (available as PO 83 F®, LR 8869®, and LR8889®, from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. In. as SR494®), and the like, as well as mixtures and combinations thereof.

When a reactive diluent is added to the ink carrier material, the reactive diluent is added in any desired or effective amount, such as from about 1 to about 80 percent by weight of the carrier, or from about 35 to about 70 percent by weight of the carrier, although the amount of diluent can be outside of theses ranges.

The ink carrier is present in the phase change ink in any desired or effective amount, such as from about 0.1 to about 97 percent by weight of the ink, or from about 50 to about 90 percent by weight of the ink, or from about 70 to about 85 percent by weight of the ink, although the amount can be outside of theses ranges.

The ink compositions further contain an initiator.

Examples of free radical initiators include benzyl ketones, monomeric hydroxyl ketones, polymeric hydroxyl ketones, α-amino ketones, acyl phosphine oxides, metallocenes, benzophenone, benzophenone derivatives, and the like. Specific examples include 1-hydroxy-cyclohexylphenylketone, (available as Irgacure® 184 from BASF Corporation), 2-benzyl-2-(dimethylamino)-1-(4-(4-morphorlinyl)phenyl)-1-butanone, 2-methyl-1-(4-methylthio)phenyl-2-(4-morphorlinyl)-1-propanone, 2,4,6-trimethylbenzoyidiphenylphosphine oxide (available as LUCIRIN TPO® from BASF Corporation), benzyl-dimethylketal, and the like, as well as mixtures and combinations thereof. Further specific examples include isopropylthioxanthone (available as DAROCURE® ITX from BASF Corporation), 2,4,6-trimethylbenzoylethoxyphenylphosphine oxide (available as LUCIRIN TPO-L® from BASF Corporation), bis(2,4,6-trimethylbenzoyl)-phenyl-phosphine oxide (available as IRGACURE® 819 from Ciba Specialty Chemicals), and other acyl phosphines, 2-methyl-1-(4-methylthio) phenyl-2-(4-morphorlinyl)-1-proponone (available as IRGACURE® 907 from Ciba Specialty Chemicals), and 1-(4-(2-hydroxyethoxy)phenyl)-2-hydroxy-2-methylpropan-1-one (available as IRGACURE® 2959 from Ciba Specialty Chemicals), 2-benzyl-2-dimethylamino-1-(4-morpholinophenyl)butanone-1 (available as IRGACURE® 369 from Ciba Specialty Chemicals), 2-hydroxy-1-(4-(4-(2-hydroxy-2-methylpropionyl)-benzyl)-phenyl)-2-methylpropan-1-one (available as IRGACURE® 127 from Ciba Specialty Chemicals), 2-dimethylamino-2-(4-methylbenzyl)-1-(4-morpholin-4-ylphenyl)-butanone (available as IRGACURE® 379 from Ciba Specialty Chemicals), titanocenes, 1-hydroxy-cyclohexylphenylketone, 2,4,6-trimethylbenzophenone, 4-methylbenzophenone, 2,4,6-trimethylbenzoylphenylphosphinic acid ethyl ester, oligo(2-hydroxy-2-methyl-1-(4-(1-methylvinyl)phenyl)propanone), 2-hydroxy-2-methyl-1-phenyl-1-propanone, and the like, as well as mixtures and combinations thereof.

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include, but are not limited to, ethyl-4-dimethylaminobenzoate, 2-ethylhexyl-4-dimethylaminobenzoate, and the like, as well as mixtures and combinations thereof.

Initiators for the inks disclosed herein can absorb radiation at any desired or effective wavelength, in embodiments, from about 200 to about 560 nanometers, or from about 200 to about 420 nanometers, although the wavelength can be outside of these ranges.

The initiator can be present in the ink in any desired or effective amount, in embodiments from about 0.5 to about 15 percent by weight of the ink, or from about 1 to about 10 percent by weight of the ink, although the amount can be outside of these ranges.

The radiation curable phase change inks can also optionally contain an antioxidant. The optional antioxidants can protect printed images from oxidation and can also protect the ink components from oxidation during the heating portion of the ink preparation process. Specific examples of suitable antioxidant stabilizers include, but are not limited to, NAUGARD®524, NAUGARD®635, NAUGARD® 1-403, and NAUGARD®959, commercially available from Crompton Corporation, IRGANOX® 1010 and IRGASTAB® UV 10, commercially available from Ciba Specialty Chemicals, GENORAD® 16 and GENORAD® 40, commercially available from Rahn AG, and the like, as well as mixtures and combinations thereof.

When present, the optional antioxidant is present in the ink in any desired or effective amount, in embodiments from about 0.01 to about 20 percent by weight of the ink carrier, or from about 0.1 to about 5 percent by weight of the ink carrier, or from about 1 to about 3 percent by weight of the ink carrier, although the amount can be outside of these ranges.

The phase change inks also contain a colorant. Any desired or effective colorant can be employed, including dyes, pigments, mixtures thereof, and the like, provided that the colorant can be dissolved or dispersed in the ink vehicle. Examples of suitable dyes include, but are not limited to, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carta Blue 2GL, available from Clariant; solvent dyes, including spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASF); Sudan Blue 670 [C.I. 61554] (BASF); Sudan Yellow 146 [C.I. 12700] (BASF); Sudan Red 462 [C.I. 260501] (BASF); and the like, as well as mixtures thereof.

Pigments are also suitable colorants for the phase change inks. Examples of suitable pigments include PALIOGEN® Violet 5100 (BASF); PALIOGEN® Violet 5890 (BASF); HELIOGEN® Green L8730 (BASF); LITHOL® Scarlet D3700 (BASF); SUNFAST® Blue 15:4 (Sun Chemical); Hostaperm® Blue B2G-D (Clariant); Permanent Red P-F7RK; Hostaperm® Violet BL (Clariant); LITHOL® Scarlet 4440 (BASF); Bon Red® C (Dominion Color Company); ORACET® Pink RF (Ciba); PALIOGEN® Red 3871 K (BASF); SUNFAST® Blue 15:3 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA PAC® C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue BCA (Ciba); PALIOGEN® Blue 6470 (BASF); Sudan Orange G (Aldrich), Sudan Orange 220 (BASF); PALIOGEN® Orange 3040 (BASF); PALIOGEN® Yellow 152, 1560 (BASF); LITHOL® Fast Yellow 0991 K (BASF); PALIOTOL® Yellow 1840 (BASF); NOVOPERM® Yellow FGL (Clariant); Lumogen® Yellow D0790 (BASF); Suco-Yellow L1250 (BASF); Suco-Yellow D1355 (BASF); Suco Fast Yellow D1 355, D1 351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA® Magenta (DU PONT); PALIOGEN® Black L0084 (BASF); Pigment Black K801 (BASF); and carbon blacks such as REGAL 330™ (Cabot), Carbon Black 5250, Carbon Black 5750 (Columbia Chemical), and the like, as well as mixtures thereof.

In another specific embodiment, the colorant is a curable olefin colorant such as those disclosed in U.S. Pat. Nos. 6,870,063, 6,870,062, 6,787,658, and 7,141,685, the disclosures of each of which are totally incorporated herein by reference.

The colorant is present in the phase change ink in any desired or effective amount to obtain the desired color or hue, in embodiments from about 0.1 percent to about 15 percent by weight of the ink, or from about 0.2 percent to about 8 percent by weight of the ink, although the amount can be outside of these ranges.

The radiation curable phase change inks can also, if desired, contain additives to take advantage of the known functionality associated with such additives. Such additives may include, for example, defoamers, slip and leveling agents, pigment dispersants, and the like, as well as mixtures and combinations thereof. The inks can also include additional monomeric or polymeric materials as desired.

Curing of the ink can be effected by exposure of the ink image to actinic radiation at any desired or effective wavelength, in embodiments from about 200 nanometers to about 480 nanometers, although the wavelength can be outside of this range. Exposure to actinic radiation can be for any desired or effective period of time, in embodiments for about 0.2 second to about 30 seconds, or from about 1 second to 15 seconds, although the exposure period can be outside of these ranges. By curing is meant that the curable compounds in the ink undergo an increase in molecular weight upon exposure to actinic radiation, such as (but not limited to) crosslinking, chain lengthening, or the like.

The ink compositions generally have melt viscosities at the jetting temperature (in embodiments no lower than about 50° C., no lower than about 60° C., no lower than about 70° C., or no higher than about 120° C., or no higher than about 110° C., although the jetting temperature can be outside of these ranges) in embodiments no more than about 30 centipoise, no more than about 20 centipoise, or no more than about 15 centipoise, or no less than about 2 centipoise, no less than about 5 centipoise, or no less than about 7 centipoise, although the melt viscosity can be outside of these ranges.

In one specific embodiment, the inks are jetted at low temperatures, in particular at temperatures below about 110° C., from about 40° C. to about 110° C., from about 50° C. to about 110° C., or from about 60° C. to about 90° C., although the jetting temperature can be outside of these ranges. At such low jetting temperatures, the conventional use of temperature differential between the jetted ink and the substrate upon which the ink is jetted to effect a rapid phase change in the ink (i.e., from liquid to solid) may not be effective. The gellant can thus be used to effect a rapid viscosity increase in the jetted ink upon the substrate. In particular, jetted ink droplets can be pinned into position on a receiving substrate such as a final recording substrate, such as paper or transparency material, or an intermediate transfer member, such as a transfuse drum or belt, that is maintained at a temperature cooler than the ink jetting temperature of the ink through the action of a phase change transition in which the ink undergoes a significant viscosity change from a liquid state to a gel state (or semi-solid state).

In some embodiments, the temperature at which the ink forms the gel state is any temperature below the jetting temperature of the ink, in one embodiment any temperature that is about 5° C. or more below the jetting temperature of the ink. In one embodiment, the gel state can be formed at a temperature of at least about 25° C., at least about 30° C., or no more than about 100° C., no more than about 70° C., or no more than about 50° C., although the temperature can be outside of these ranges. A rapid and large increase in ink viscosity occurs upon cooling from the jetting temperature, at which the ink is in a liquid state, to the gel temperature, at which the ink is in the gel state. The viscosity increase is in one specific embodiment at least a $10^{2.5}$-fold increase in viscosity.

It has been found that optimum transfer efficiency from an intermediate transfer surface to a final recording sheet and optimum print quality can be achieved if the viscosity of the ink image deposited on the intermediate transfer member is greatly increased after jetting the ink, so as to obtain a stable and transferable image that will not smear. A suitable gelling agent for the ink will gel the monomers/oligomers in the ink vehicle quickly and reversibly and will demonstrate a narrow phase change transition, for example within a temperature range of from about 30° C. to about 100° C., or from about 30° C. to about 70° C., although the transition range can be outside of these temperature ranges. The gel state of the ink in one specific embodiment exhibits a minimum of $10^{25}$ centipoise, and in another specific embodiment $10^3$ centipoise, increase in viscosity at transferring temperatures, e.g., in one specific embodiment from about 30 to about 70° C., compared to the viscosity at the jetting temperature. One specific embodiment is directed to gellant containing inks that rapidly increase in viscosity within from about 5° C. to about 10° C. below the jetting temperature and ultimately reach a viscosity above $10^4$ times the jetting viscosity, and in another embodiment about $10^5$ times the jetting viscosity, although the viscosity can be outside of these ranges.

When the inks are in the gel state, the viscosity of the ink is, in one embodiments, at least about 1,000 centipoise, at least about 10,000 centipoise, or at least about 100,000 centipoise, although the viscosity can be outside of these ranges. Viscosity values in the gel state are in one embodiment at least about $10^3$ centipoise, at least about $10^{4.5}$ centipoise, no more than about $10^9$ centipoise, or no more than about $10^{6.5}$ centipoise, although the gel state viscosity can be outside of these ranges. The preferred gel phase viscosity can vary with the print process. For example, the highest viscosities are preferred when employing intermediate transfer, or when jetting directly to porous paper in order to minimize the effects of ink bleed and feathering. On the other hand, less porous substrates such as plastic may lead to the use of lower ink viscosities that control dot gain and agglomeration of individual ink pixels. The gel viscosity can be controlled by ink formulation and substrate temperature. An additional benefit of the gel state for radiation curable inks is that higher viscosities of about $10^3$ to about $10^4$ centipoise can reduce oxygen diffusion in the ink, which in turn can lead to a faster rate of cure in free radical initiation.

For printing applications wherein the ink is printed onto an intermediate transfer member and subsequently transferred to a final substrate, the viscosity of the ink in one specific embodiment increases to about $10^6$ centipoise or greater at the intermediate transfer member temperature to facilitate adhesion to the intermediate transfer member, and for printing applications wherein the ink is printed directly onto a final substrate, the viscosity of the ink in one specific embodiment increases to $10^6$ centipoise or greater at the final substrate temperature to prevent the ink from soaking into the final substrate and/or to facilitate adhesion to the final substrate until curing by exposure to radiation. In one specific embodiment, the temperature of the intermediate transfer member or the final substrate onto which the ink is printed and at which the ink viscosity increases to about $10^6$ centipoise or greater is about 50° C. or lower.

The ink compositions can be prepared by any desired or suitable method. For example, the ink ingredients can be mixed together, followed by heating, to a temperature of, in embodiments, at least about 80° C. or no more than about 120° C., although the temperature can be outside of this ranges, and stirring until a homogeneous ink composition is obtained, followed by cooling the ink to ambient temperature (typically from about 20 to about 25° C.). The inks are solid at ambient temperature.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes. In embodiments, the process comprises exposing the imagewise pattern to ultraviolet radiation.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers, LUSTROGLOSS®, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Preparation of organoamide precursor. An organoamide precursor was prepared as follows. To a 4 liter kettle equipped with a heating mantle, overhead stirrer with PTFE (polytetrafluoroethylene) paddle, 250 milliliter dropping funnel, Dean-Stark trap and reflux condenser was added Pripol® C36 dimer diacid (acid# 196, 2 equivalents, 4.23 moles, 2,422 grams, available from Cognis Corporation) followed by Irgafos® 168 (0.2 weight %, 5.1 grams, 7.9 millimoles, available from BASF Corporation). The viscous solution was heated to 90° C., purged with Argon and stirred. Next, ethylene diamine (1 equivalent, 2.11 moles, 141.4 milliliters, obtained from Sigma-Aldrich Fine Chemicals) was charged into the dropping funnel and added dropwise to the kettle over 1 hour. After addition was complete, the kettle was heated to 155° C., and held at this temperature for 3 hours. During this time, the water condensate was collected in the Dean-Stark trap. After 3 hours' time, the reaction product was a viscous golden syrup. The reaction was stopped, and the molten product was discharged into foil pans to cool to room temperature. 2,205 grams of organoamide product was isolated as a tacky, amber resin. Acid#: 92.23, amine#: 1.64. The organoamide precursor was used in the following examples.

Comparative Example 1

A conventional gellant compound was prepared as follows. 331 grams of molten organoamide precursor described above (285 millimoles, 1 equivalent) were added to a 5 liter round bottomed flask equipped with a magnetic stir bar. Next, 3.6 liters of dichloromethane were added, and the mixture was stirred until all of the organoamide was dissolved. Next, 4,4-dimethylaminopyridine (7.0 grams, 57.3 millimoles, 0.20 equivalent) was added, followed by addition of 1,3-dicyclohexylcarbodiimide (141.95 grams, 688 millimoles, 2.4 equivalents). After 15 minutes, a cloudy suspension formed. To the suspension were added Irgacure® 2959 (64.22 grams, 286 millimoles, 1 equivalent) and SR495B® caprolactone acrylate (98.39 grams, 286 millimoles, 1 equivalent), and the reaction was allowed to stir overnight at room temperature. The next day, the reaction mixture was filtered to remove N,N-dicyclohexylurea (byproduct) and the filtrate solvent was removed in vacuo to yield an off-white, opaque solid. The solid residue was reslurried in 2 liters of acetone with stirring for 2 hours, then re-filtered to give a rubbery solid. The solid residue was dried in a vacuum oven for 2 hours at 90° C. to remove residual solvent, to furnish 410 grams (242 millimoles, 85% yield) of conventional gellant product as a translucent gel whose major component is believed to be of the formula $C_{103}H_{184}N_2O_{15}$.

It is noted that the Pripol® starting material in step 1 is a product mixture, and is 'mostly' dimer acid. As a consequence, the organoamide and gellant are also mixtures. Moreover, the organoamide can have some oligomeric content.

$^1$H NMR (ppm, CDCl$_3$, 300 MHz, room temperature): δ 8.08 (2H, d, J=9 Hz, ArH), 6.97 (2H, d, J=9 Hz, ArH), 6.45 (1H, d, J=17 Hz, CH$_2$=CHC(O)), 6.15 (1H, dd, J=18 Hz, 10.5 Hz, CH$_2$=CHC(O)), 5.88 (1H, d, J=10.5 Hz, CH$_2$=CHC(O)), 4.46 (2H, m, CH$_2$O), 4.35 (4H, m, CH$_2$O), 4.26 (2H, m, CH$_2$O), 4.07 (4H, m, CH$_2$O), 3.01 (4H, br, NHCH$_2$CH$_2$NH) 2.33 (8H, m, α-CH$_2$ (esters)), 2.18 (4H, t, J=7.2 Hz, α-CH$_2$ (amide)), 1.62-0.88 (br, aliphatic H).

Example 2

A phenethyl gellant compound was prepared as follows. 68.61 grams of molten organoamide precursor described above (59.3 millimoles, 1 equivalent) were added to a 1 liter round bottomed flask equipped with a magnetic stir bar. Next, 350 milliliters of dichloromethane were added, and the mixture was stirred until all of the organoamide was dissolved. Next, 4,4-dimethylaminopyridine (1.086 grams, 8.89 millimoles, 0.15 equivalent) was added, followed by addition of 1,3-dicyclohexylcarbodiimide (29.3 grams, 142 millimoles, 2.4 equivalents). After 15 minutes, a cloudy suspension formed. To the suspension was added 2-phenethyl alcohol (14.48 grams, 119 millimoles, 2 equivalents), and the reaction was allowed to stir overnight at room temperature. The next day, the reaction mixture was filtered to remove N,N-dicyclohexylurea (by-product) and the filtrate solvent was removed in vacuo to yield an off-white, opaque solid. The solid residue was dried in a vacuum oven for 2 hours at 90° C. to remove residual solvent, to furnish 61.27 grams (44.8 millimoles, 76% yield) of phenethyl gellant product as a translucent gel believed to be of the formula

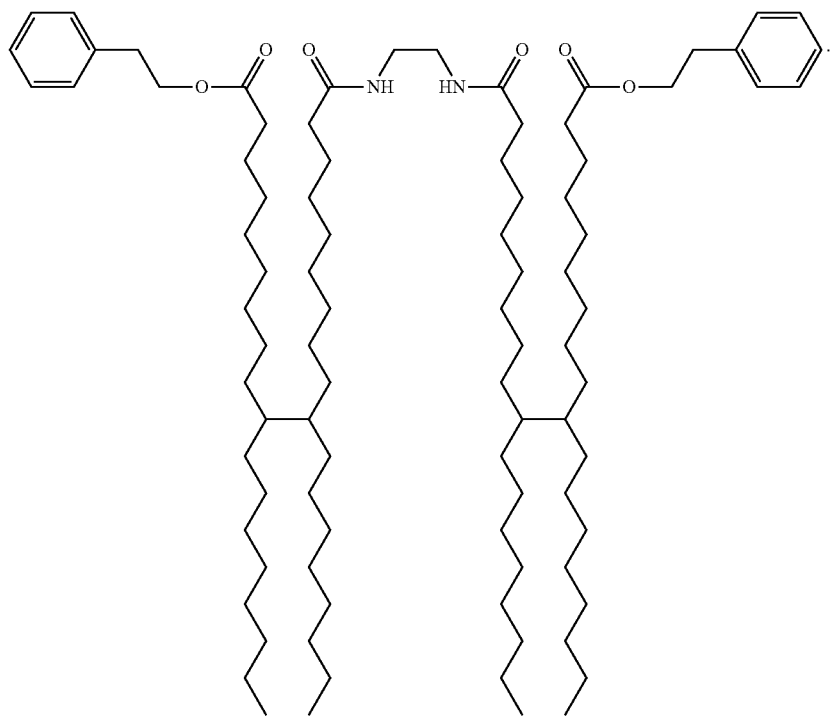 [SMILES: CCCCCCCCC(CCCCCCCCC(=O)NCCNC(=O)CCCCCCCCC(CCCCCCCC)C(CCCCCCCC)CCCCCCCCC(=O)OCCc1ccccc1)C(CCCCCCCC)CCCCCCCCC(=O)OCCc1ccccc1]

$^1$H NMR (ppm, CDCl$_3$, 300 MHz, room temperature): δ 7.27 (10H, m, ArH), 4.30 (4H, t, J=7.2 Hz, ArCH$_2$CH$_2$O), 3.39 (4H, br, NHCH$_2$CH$_2$NH), 2.95 (4H, t, J=7 Hz, ArCH$_2$) 2.5, (2H, br, NH), 2.28 (4H, t, J=7.5 Hz, α-CH$_2$ (ester)), 2.19 (4H, t, J=7.5 Hz, α-CH$_2$ (amide)), 1.62-0.88 (br, aliphatic H).

Example 3

A benzyl gellant compound was prepared as follows. 57.84 grams of molten organoamide precursor described above (50 millimoles, 1 equivalent) were added to a 1 liter round bottomed flask equipped with a magnetic stir bar. Next, 350 milliliters of dichloromethane were added, and the mixture was stirred until all of the organoamide was dissolved. Next, 4,4-dimethylaminopyridine (0.915 grams, 7.49 millimoles, 0.15 equivalent) was added, followed by addition of 1,3-dicyclohexylcarbodiimide (24.73 grams, 120 millimoles, 2.4 equivalents). After 15 minutes, a cloudy suspension formed. To the suspension was added benzyl alcohol (5.4 grams, 50 millimoles, 1.0 equivalent), and the reaction was allowed to stir overnight at room temperature. The next day, the reaction was filtered to remove N,N-dicyclohexylurea (byproduct) and the filtrate solvent was removed in vacuo to yield an off-white, opaque solid. The solid residue was dried in a vacuum oven for 2 hours at 90° C. to remove residual solvent, to furnish 67.51 grams (50.4 millimoles, 101% yield) of benzyl gellant product as a translucent gel believed to be of the formula

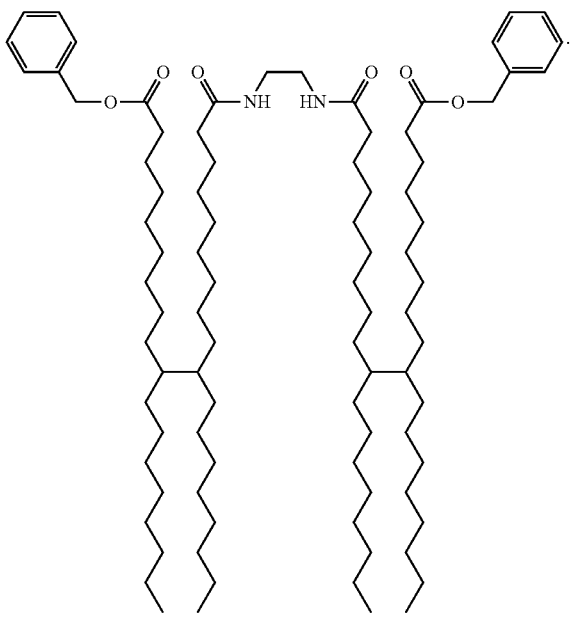 [SMILES: CCCCCCCCC(CCCCCCCCC(=O)NCCNC(=O)CCCCCCCCC(CCCCCCCC)C(CCCCCCCC)CCCCCCCCC(=O)OCc1ccccc1)C(CCCCCCCC)CCCCCCCCC(=O)OCc1ccccc1]

$^1$H NMR (ppm, CDCl$_3$, 300 MHz, room temperature): δ 7.36 (10H, m, ArH), 5.13 (4H, s, ArCH$_2$), 3.38 (4H, br, NHCH$_2$CH$_2$NH), 2.28 (4H, t, J=7.5 Hz, α-CH$_2$ (ester)), 2.18 (4H, t, J=7.5 Hz, α-CH$_2$ (amide)), 1.62-0.88 (br, aliphatic H).

Example 4

A phenol gellant compound was prepared as follows. 15.28 grams of molten organoamide precursor described above (acid number: 97.16, n$_{acid}$=26.46 millimoles, 1 equivalent) were added to a 250 milliliter round bottomed flask equipped with a magnetic stir bar. Next, 150 milliliters of dichloromethane were added, and the mixture was stirred until all of the organoamide was dissolved. Next, 4,4-dimethylaminopyridine (323 milligrams, 0.1 millimole) was added, followed by addition of 1,3-dicyclohexylcarbodiimide (6.55 grams, 31.75 millimoles, 1.2 equivalents). After 15 minutes, a cloudy suspension formed. To the suspension was added phenol (2.49 grams, 1.0 equivalent), and the reaction was allowed to stir overnight at room temperature. The next day, the reaction was filtered to remove N,N-dicyclohexylurea (by-product) and the filtrate solvent was removed in vacuo to yield an off-white, opaque solid. The solid residue was dried in a vacuum oven for 2 hours at 90° C. to remove residual solvent, to furnish 11.3 grams (17.2 millimoles, 65%) of gellant product as a translucent gel believed to be of the formula

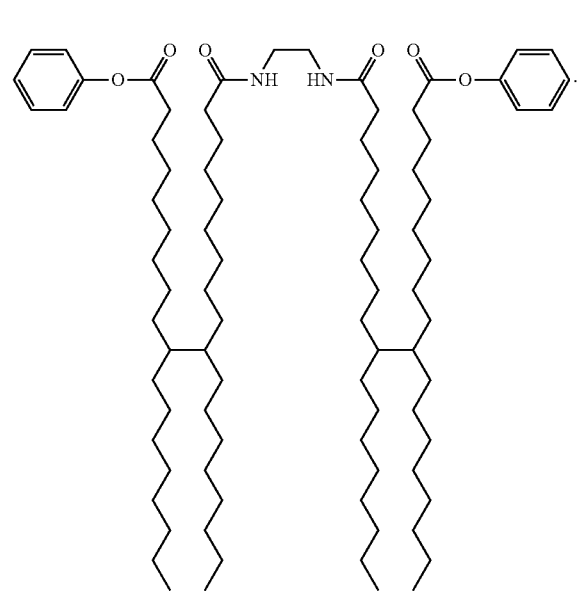 [SMILES: CCCCCCCCC(CCCCCCCCC(=O)NCCNC(=O)CCCCCCCCC(CCCCCCCC)C(CCCCCCCC)CCCCCCCCC(=O)Oc1ccccc1)C(CCCCCCCC)CCCCCCCCC(=O)Oc1ccccc1]

$^1$H NMR (ppm, CDCl$_3$, 300 MHz, room temperature): δ 7.41-7.08 (10H, m, ArH), 3.36 (4H, br, NHCH$_2$CH$_2$NH), 2.60 (4H, t, J=7.5 Hz, α-CH$_2$ (ester)), 2.18 (4H, t, J=7.5 Hz, α-CH$_2$ (amide)), 1.95-0.85 (br, aliphatic H).

Example 5

A phenyl glycol gellant compound was prepared as follows. 64.06 grams of molten organoamide precursor described above (55.3 millimoles, 1 equivalent) were added to a 1 liter round bottomed flask equipped with a magnetic stir bar. Next, 350 milliliters of dichloromethane were added, and the mixture was stirred until all of the organoamide was dissolved. Next, 4,4-dimethylaminopyridine (1.014 grams, 8.30 millimoles, 0.15 equivalent) was added, followed by addition of 1,3-dicyclohexylcarbodiimide (27.4 grams, 133 millimoles, 2.4 equivalents). After 15 minutes, a cloudy suspension formed. To the suspension was added phenyl glycol (15.29 grams, 111 millimoles, 2 equivalents), and the reaction was allowed to stir overnight at room temperature. The next day, the reaction mixture was filtered to remove N,N-dicyclohexylurea (by-product) and the filtrate solvent was removed in vacuo to yield an off-white, opaque solid. The solid residue was dried in a vacuum oven for 2 hours at 90° C. to remove residual solvent, to furnish 41.5 grams (29.7 millimoles, 53.6% yield) of phenyl glycol gellant product as a translucent gel believed to be of the formula

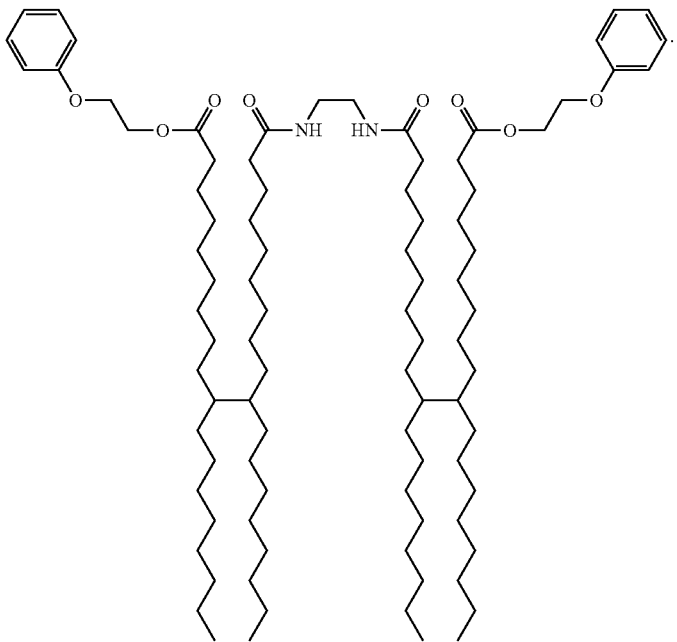 [SMILES: CCCCCCCCC(CCCCCCCCC(=O)NCCNC(=O)CCCCCCCCC(CCCCCCCC)C(CCCCCCCC)CCCCCCCCC(=O)OCCOc1ccccc1)C(CCCCCCCC)CCCCCCCCC(=O)OCCOc1ccccc1]

$^1$H NMR (ppm, CDCl$_3$, 300 MHz, room temperature): δ 7.31 (4H, m, ArH), 6.94 (6H, m, ArH), 4.44 (4H, J=4.8 Hz, ArOCH2), 4.19 (4H, t, J=5.1 Hz, ArOCH$_2$CH$_2$), 3.38 (4H, br, NHCH$_2$CH$_2$NH), 2.36 (4H, t, J=7.5 Hz, α-CH2 (ester)), 2.19 (4H, t, J=7.5 Hz, α-CH$_2$ (amide)), 1.95-0.85 (br, aliphatic H).

Example 6

A mixed benzyl gellant compound was prepared as follows. 54.6 grams of molten organoamide precursor described above (47.2 millimoles, 1 equivalent) were added to a 1 liter round bottomed flask equipped with a magnetic stir bar. Next, 350 milliliters of dichloromethane were added, and the mixture was stirred until all of the organoamide was dissolved. Next, 4,4-dimethylaminopyridine (0.864 grams, 7.07 millimoles, 0.15 equivalent) was added, followed by addition of 1,3-dicyclohexylcarbodiimide (23.35 grams, 113 millimoles, 2.4 equivalents). After 15 minutes, a cloudy suspension formed. To the suspension was added benzyl alcohol (5.1 grams, 47.2 millimoles, 1.0 equivalent) and caprolactone acrylate (SR495B® available from Sartomer Corporation, 16.26 grams, 47.2 millimoles, 1.0 equivalent), and the reaction was allowed to stir overnight at room temperature. The next day, the reaction was filtered to remove N,N-dicyclohexylurea (by-product) and the filtrate solvent was removed in vacuo to yield an off-white, opaque solid. The solid residue was dried in a vacuum oven for 2 hours at 90° C. to remove residual solvent, to furnish 64.7 grams (41.1 millimoles, 87% yield) of mixed benzyl gellant product as a translucent gel believed to be of the formula

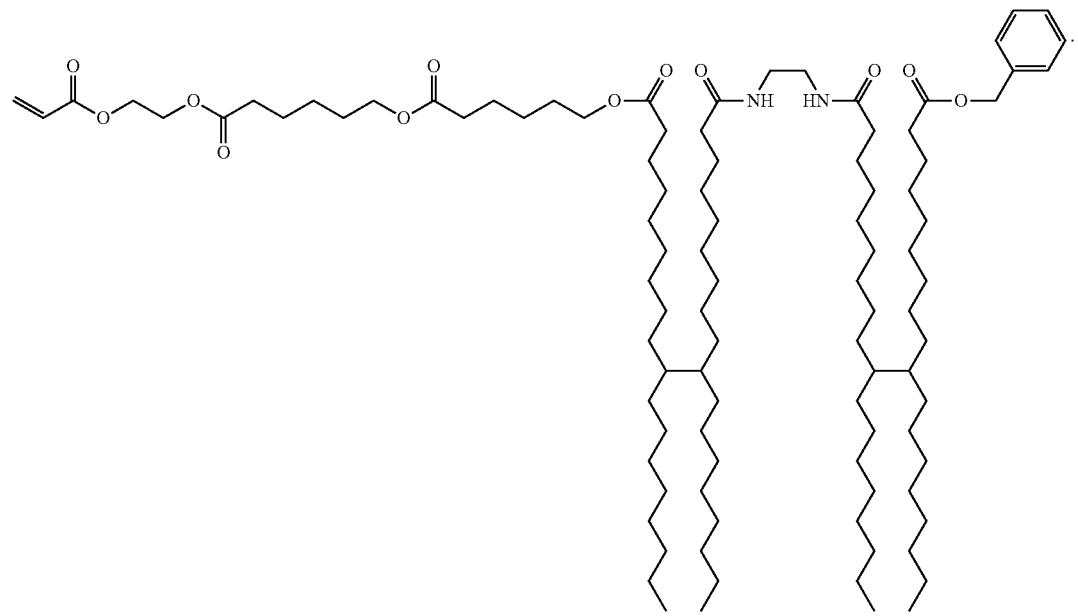 [SMILES: C=CC(=O)OCCOC(=O)CCCCCOC(=O)CCCCCOC(=O)CCCCCCCCC(CCCCCCCC)C(CCCCCCCC)CCCCCCCCC(=O)NCCNC(=O)CCCCCCCCC(CCCCCCCC)C(CCCCCCCC)CCCCCCCCC(=O)OCc1ccccc1]

$^1$H NMR (ppm, CDCl$_3$, 300 MHz, room temperature): δ 7.36 (5H, m, ArH), 6.44 (1H, d, J=15.6 Hz, CH$_2$=CHC(O)), 6.18 (1H, m, CH$_2$=CHC(O)), 5.87 (1H, d, J=10.2 Hz, CH$_2$=CHC(O)), 5.12 (2H, s, ArCH$_2$), 4.35 (4H, m, CH$_2$O), 4.07 (4H, t, J=7 Hz, CH$_2$O), 3.38 (4H, br, NHCH$_2$CH$_2$NH), 2.33 (4H, t, J=7.5 Hz, α-CH$_2$ (ester)), 2.18 (4H, t, J=7.5 Hz, α-CH$_2$ (amide)), 1.95-0.85 (br, aliphatic H).

Example 7

A mixed phenethyl gellant compound was prepared as follows. 66.58 grams of molten organoamide precursor described above (57.5 millimoles, 1 equivalent) were added to a 1 liter round bottomed flask equipped with a magnetic stir bar. Next, 350 milliliters of dichloromethane were added, and the mixture was stirred until all of the organoamide was dissolved. Next, 4,4-dimethylaminopyridine (1.054 grams, 8.62 millimoles, 0.15 equivalent) was added, followed by addition of 1,3-dicyclohexylcarbodiimide (28.5 grams, 138 millimoles, 2.4 equivalents). After 15 minutes, a cloudy suspension formed. To the suspension was added 2-phenylethyl alcohol (7.02 grams, 57.5 millimoles, 1.0 equivalent) and caprolactone acrylate (SR495B® available from Sartomer Corporation, 16.26 grams, 47.2 millimoles, 1.0 equivalent), and the reaction was allowed to stir overnight at room temperature. The next day, the reaction was filtered to remove N,N-dicyclohexylurea (by-product) and the filtrate solvent was removed in vacuo to yield an off-white, opaque solid. The solid residue was dried in a vacuum oven for 2 hours at 90° C. to remove residual solvent, to furnish 82 grams (51.6 millimoles, 90% yield) of mixed benzyl gellant product as a translucent gel believed to be of the formula $^1$H NMR (ppm, CDCl$_3$, 300 MHz, room temperature): δ 7.29-7.22 (5H, m, ArH), 6.45 (1H, d, J=17 Hz, CH$_2$=CHC(O)), 6.16 (1H, m, CH$_2$=CHC(O)), 5.88 (1H, d, J=10.5 Hz, CH$_2$=CHC(O)), 4.35 (4H, m, CH$_2$O), 4.07 (4H, t, J=7 Hz, CH$_2$O), 3.38 (4H, br, NHCH$_2$CH$_2$NH), 2.33 (4H, t, J=7.5 Hz, α-CH$_2$ (ester)), 2.18 (4H, t, J=7.5 Hz, α-CH$_2$ (amide)), 1.95-0.85 (br, aliphatic H).

Example 8

A mixed phenyl glycol gellant compound was prepared as follows. 66.13 grams of molten organoamide precursor described above (57.1 millimoles, 1 equivalent) were added to a 1 liter round bottomed flask equipped with a magnetic stir bar. Next, 350 milliliters of dichloromethane were added, and the mixture was stirred until all of the organoamide was dissolved. Next, 4,4-dimethylaminopyridine (1.047 grams, 8.57 millimoles, 0.15 equivalent) was added, followed by addition of 1,3-dicyclohexylcarbodiimide (28.3 grams, 137 millimoles, 2.4 equivalents). After 15 minutes, a cloudy suspension formed. To the suspension was added phenyl glycol (7.89 grams, 57.1 millimoles, 1.0 equivalent) and caprolactone acrylate (SR495B® available from Sartomer Corporation, 16.26 grams, 47.2 millimoles, 1.0 equivalent), and the reaction was allowed to stir overnight at room temperature. The next day, the reaction was filtered to remove N,N-dicyclohexylurea (byproduct) and the filtrate solvent was removed in vacuo to yield an off-white, opaque solid. The solid residue was dried in a vacuum oven for 2 hours at 90° C. to remove residual solvent, to furnish 78.83 grams (49.1 millimoles, 86% yield) of mixed phenyl glycol gellant product as a translucent gel believed to be of the formula

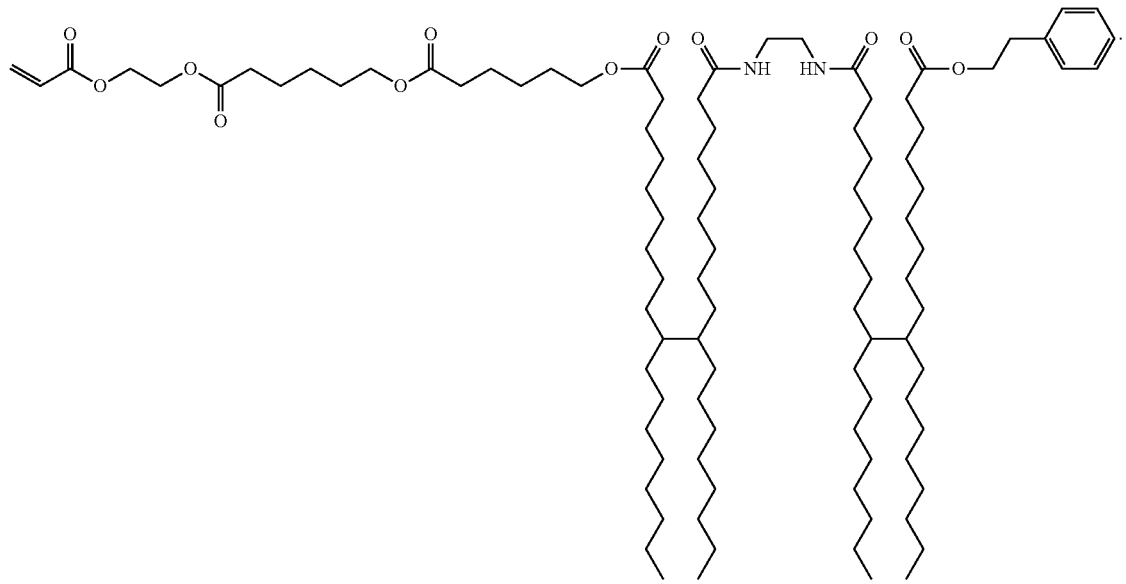 [SMILES: C=CC(=O)OCCOC(=O)CCCCCOC(=O)CCCCCOC(=O)CCCCCCCCC(CCCCCCCC)C(CCCCCCCC)CCCCCCCCC(=O)NCCNC(=O)CCCCCCCCC(CCCCCCCC)C(CCCCCCCC)CCCCCCCCC(=O)OCCc1ccccc1]

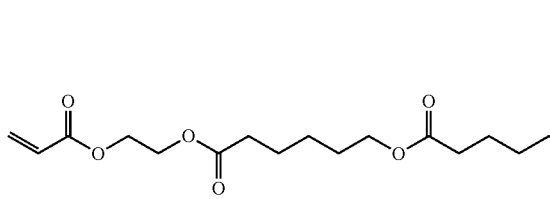
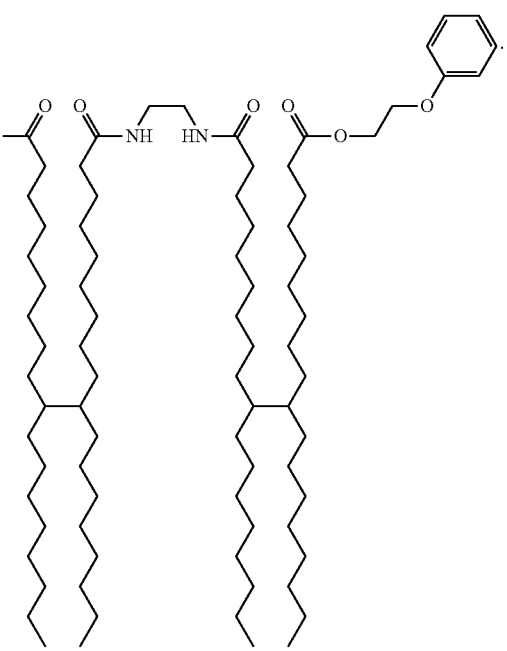

$^1$H NMR (ppm, CDCl$_3$, 300 MHz, room temperature): δ 7.28-6.95 (5H, m, ArH), 6.45 (1H, d, J=17 Hz, CH$_2$=CHC (O)), 6.18 (1H, dd, J=18 Hz, 10.5 Hz, CH$_2$=CHC(O)), 6.12 (1H, d, J=10.5 Hz, CH$_2$=CHC(O)), 4.44 (2H, m, CH$_2$CH$_2$O), 4.35 (4H, m, CH$_2$O), 4.18 (2H, m, CH$_2$O), 4.07 (4H, t, J=7 Hz, CH$_2$O), 3.38 (4H, br, NHCH$_2$CH$_2$NH), 2.33 (4H, t, J=7.5 Hz, α-CH$_2$ (ester)), 2.18 (4H, t, J=7.5 Hz, α-CH$_2$ (amide)), 1.95-0.85 (br, aliphatic H).

Ultraviolet/visible spectral comparison of some of the gellants disclosed herein were obtained using a Cary spectrophotometer. All samples were prepared at concentrations of 0.2 mg/mL in dichloromethane. FIG. 1 shows absorbance (y-axis) versus wavelength (x-axis, nanometers) for Comparative gellant Example 1 (line 10), Example 2 (phenethyl gellant, line 16), Example 3 (di-benzyl gellant, line 14, and Example 4 (phenol gellant, line 12).

Figure 2:
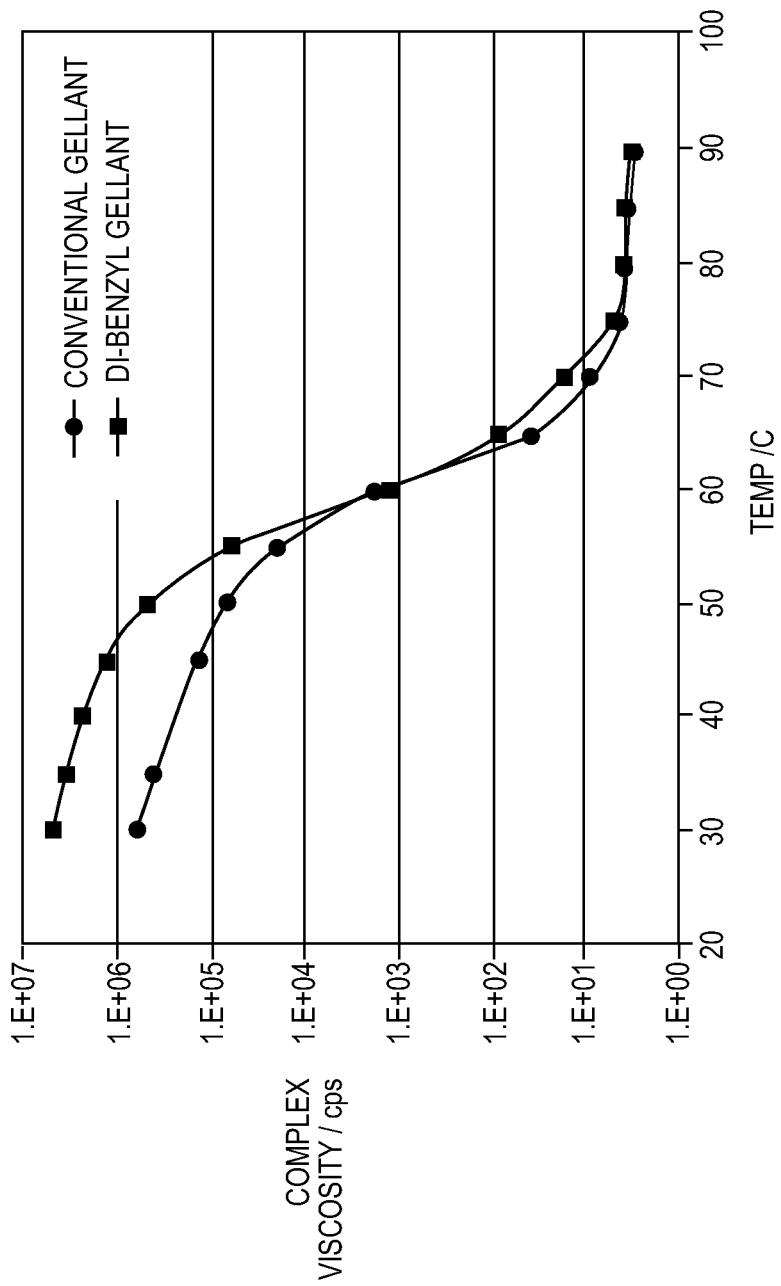
FIG. 2 is a graph showing complex viscosity (y-axis) versus temperature (x-axis) for a comparative gellant and for a di-benzyl gellant in accordance with the present disclosure.

Rheological characteristics of the gellant of Comparative Example 1 and the di-benzyl gellant of Example 3 were obtained by testing with a controlled-strain rheometer from TA Instruments (Rheometrics RFS-3). A temperature sweep from 90° C. to 30° C. at 1 Hz sweep rate was conducted with measurements every five degrees. FIG. 2 illustrates complex viscosity (y-axis, centipoise) versus temperature (x-axis, ° C.) for the gellant of Comparative Example 1 ("conventional gellant") and the di-benzyl gellant of Example 3.

Example 9

Phase Change Ink Containing Curable Amide Gellant Compound with Aromatic End Group A curable solid ink composition was prepared by combining the components in the Table below in the amounts listed according to the processes described herein. To a 600 milliliter beaker was added the amide gellant of Example 3 above, Unilin® 350 acrylate, SR9003®, SR399LV®, IRGACURE® 379, DAROCUR® ITX, IRGACURE® 819, IRGACURE® 127, and IRGASTAB® UV-10. The mixture was stirred with a magnetic stir bar and heated to 90° C. for 1 hour to form a clear solution. The solution was hot filtered through a 1 micrometer Parker filter with pressure and transferred to a dropping funnel fitted with heater tape. The filtered base was slowly added to the cyan pigment dispersion in a heated 600 milliliter beaker with stirring over 1 hour. The ink was mixed for 2 hours at 90° C., and filtered again through a 1 micrometer Parker filter with pressure.

Unilin® 350 acrylate is a curable acrylate wax derived from Unilin® 350 alcohol available from Baker Petrolite, (C22, C23, C24 mixture, melting point about 50 to about 60 C). Unilin 350 can be used as received or synthesized as described in U.S. Pat. No. 7,559,639, which is hereby incorporated by reference herein in its entirety;

SR9003® is a low viscosity propoxylated (2) neopentyl glycol diacrylate monomer available from Sartomer Company, Inc.;

SR399LV® is a low viscosity dipentaerythritol pentaacrylate (pentafunctional acrylate ester) monomer available from Sartomer Company, Inc.;

IRGACURE® 379 is an α-amino ketone photoinitiator comprising 2-dimethylamino-2-(4-methylbenzyl)-1-(4-morpholin-4-ylphenyl)-butanone, melting range 82 to 87° C., available from Ciba Specialty Chemicals;

DAROCUR® ITX is a photoinitiator comprising a mixture of 2-isopropylthioxanthone and 4-isopropylthioxanthone, available from Ciba Specialty Chemicals;

IRGACURE® 819 is a bis acyl phosphine photoinitiator comprising bis(2,4,6-trimethyl benzoyl)-phenylphosphineoxide, melting point 127 to 133° C., available from Ciba Specialty Chemicals;

IRGACURE® 127 is a photoinitiator comprising 2-hydroxy-1-(4-(4-(2-hydroxy-2-methylpropionyl)-benzyl)-phenyl)-2-methylpropan-1-one, melting point 82 to 90° C., available from Ciba Specialty Chemicals;

IRGASTAB® UV-10 is a nitroxyl based stabilizer available from Ciba Specialty Chemicals;

EFKA® 4340 is a high molecular weight dispersing agent having an AB-diblock copolymer structure available from Ciba Specialty Chemicals Inc.;

TABLE 1

Ink Example 9

| Component | Weight % | m/g |
|---|---|---|
| Amide gellant of Example 3 | 7.5 | 37.5 |
| Unilin ® 350 Acrylate-prepared as described in U.S. Pat. No. 7,559,639 | 5 | 25 |

TABLE 1-continued

Ink Example 9

| Component | Weight % | m/g |
|---|---|---|
| SR9003 ® | 52.8 | 264 |
| SR399LV ® | 5 | 25 |
| IRGACURE ® 379 | 3 | 15 |
| DAROCUR ® ITX | 2 | 10 |
| IRGACURE ® 819 | 1 | 5 |
| IRGACURE ® 127 | 3.5 | 17.5 |
| IRGASTAB ® UV10 | 0.2 | 1 |
| Cyan Pigment Dispersion* | 20 | 100 |
| TOTAL | 100 | 500 |

*Cyan Pigment Dispersion: 15 weight percent cyan pigment in EFKA ® 4340

Comparative Example 10

Phase Change Ink Containing Conventional Gellant Compound

A comparative curable solid ink composition was prepared by combining the components in the Table below in the amounts listed according to the processes described herein. To a 600 milliliter beaker was added the amide gellant of Example 3 above, Unilin® 350 acrylate, SR9003®, SR399LV®, IRGACURE® 379, DAROCUR® ITX, IRGACURE® 819, IRGACURE® 127, and IRGASTAB® UV-10. The mixture was stirred with a magnetic stir bar and heated to 90° C. for 1 hour to form a clear solution. The solution was hot filtered through a 1 micrometer Parker filter with pressure and transferred to a dropping funnel fitted with heater tape. The filtered base was slowly added to the cyan pigment dispersion in a heated 600 milliliter beaker with stirring over 1 hour. The ink was mixed for 2 hours at 90° C., and filtered again through a 1 micrometer Parker filter with pressure.

TABLE 2

Comparative Ink Example 10

| Component | Weight % | m/g |
|---|---|---|
| Amide gellant of Comparative Example 1 | 7.5 | 37.5 |
| Unilin ® 350 Acrylate-prepared as described in U.S. Pat. No. 7,559,639 | 5 | 25 |
| SR9003 ® | 52.8 | 264 |
| SR399LV ® | 5 | 25 |
| IRGACURE ® 379 | 3 | 15 |
| DAROCUR ® ITX | 2 | 10 |
| IRGACURE ® 819 | 1 | 5 |
| IRGACURE ® 127 | 3.5 | 17.5 |
| IRGASTAB ® UV10 | 0.2 | 1 |
| Cyan Pigment Dispersion* | 20 | 100 |
| TOTAL | 100 | 500 |

*Cyan Pigment Dispersion: 15 weight percent cyan pigment in EFKA ® 4340

Figure 3:
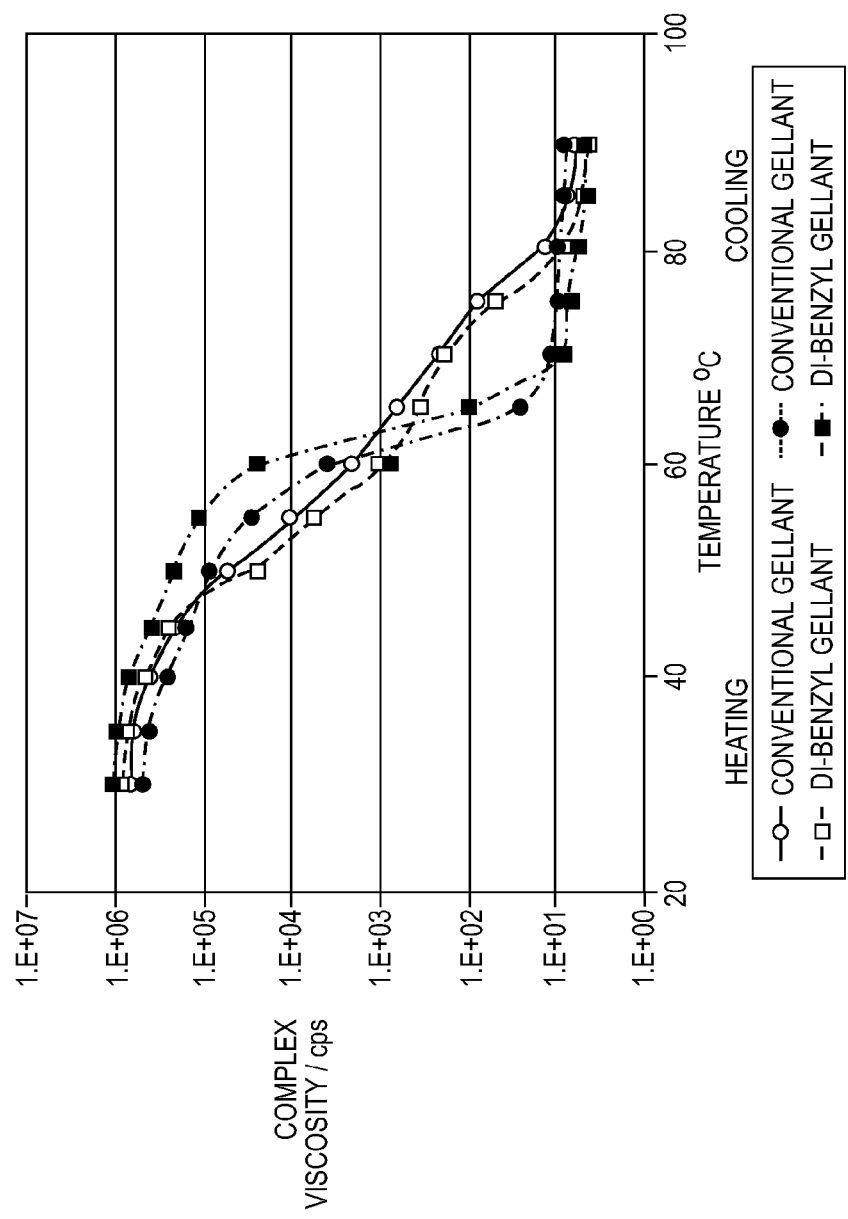
FIG. 3 is a graph showing complex viscosity (y-axis) versus temperature (x-axis) for a comparative ink and an exemplary ink in accordance with the present disclosure.

Rheological characteristics of the benzyl gellant ink of Example 9 and the comparative gellant ink of Comparative Example 10 were obtained by testing with a controlled-strain rheometer from TA Instruments. A temperature sweep from 90° C. to 30° C. at 1 Hz sweep rate was conducted with measurements every five degrees. FIG. 3 illustrates complex viscosity (y-axis, centipoise) versus temperature (x-axis, ° C.) for the benzyl gellant ink of Example 9 and the comparative gellant ink of Comparative Example 10. Black circles indicate cyan ink (conventional gellant) on going from hot to cold (cooling/freezing). White circles indicate cyan ink (conventional gellant) on going from cold to hot (heating/melting). Black squares indicate cyan ink (benzyl gellant) on going from hot to cold (cooling/freezing). White squares indicate cyan ink (benzyl gellant) on going from cold to hot (heating/melting).

Figure 4:
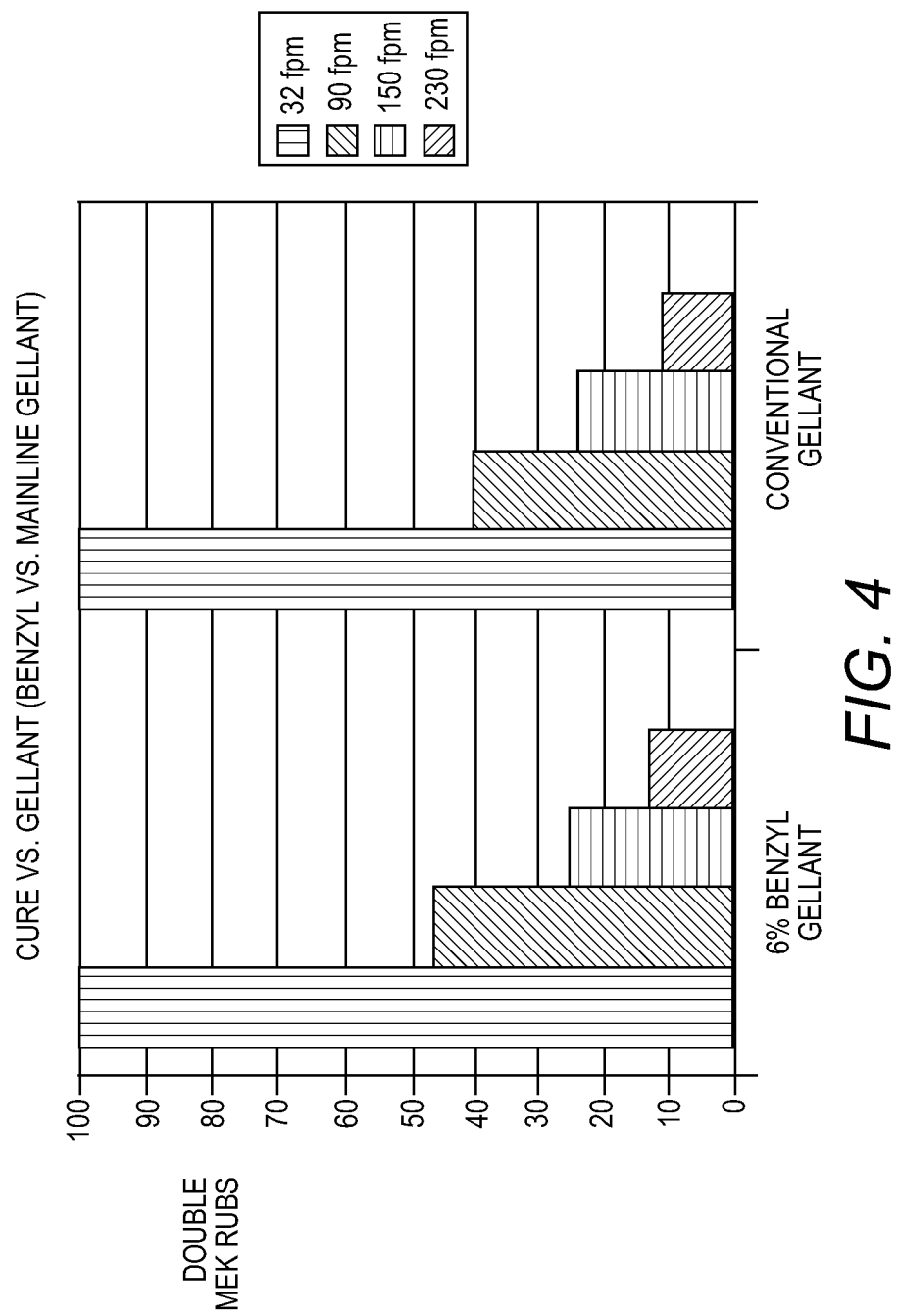
FIG. 4 is a bar graph showing cure response for a comparative gellant and an exemplary gellant in accordance with the present disclosure.

Printed samples of the inks prepared in Example 9 and Comparative Example 10 were generated on Mylar® film using a K Printing Proofer (manufactured by RK Print Coat Instrument Ltd., Litlington, Royston, Heris, SG8 0OZ, U.K.). In this method, the tested inks were melted onto a printing plate set at 150° C. A roller bar fitted with the Mylar® film was then rolled over the plate containing the melted ink on its surface. The ink on the Mylar® film was cooled, resulting in three separated images of rectangular blocks. The printed ink was cured by passing through a Fusions UV Lighthammer® available from Fusions UV Systems, Inc., equipped with a 600 W mercury D-bulb at a variety of conveyor belt speeds including 10 feet per minute (fpm), 32 fpm, 90 fpm, 150 fpm, and 230 fpm. The cured prints were evaluated using a methyl ethyl ketone (MEK) double rub test (ASTM D4752 Solvent Resistance Rub Test). FIG. 4 illustrates double MEK rub response for the benzyl gellant ink of Example 9 and the comparative conventional gellant ink of Comparative Example 10.

Thus, in embodiments, gellant compositions comprising an organoamide of a C-36 dimer diacid having only aryl ester end groups, such as benzyl groups, and the like, provide a much simpler gellant over prior gellants which comprise more complex oligoamides having photoinitiator groups as one end-cap and caprolactone acrylate groups as the second end-cap. In embodiments, the present gellants are photoinitiator-free and exhibit lower UV-absorbance in the spectral region required for curing as compared with prior gellants. In further embodiments, the present gellants provide a more cost-effective scale-up as compared with prior gellants which required removal of many inactive side-products. In embodiments, the present oligoamide gellant derivative has only one functional moiety for the end-groups, providing a product that can be easily prepared at large scale by a simple, cost-effective process. In addition, in embodiments, it was found that the di-benzyl end-capped oligoamide gellant had significantly reduced UV absorbance in the curing spectral region, resulting in reduced UV-light energy requirements for effective curing of phase change ink prepared with the present gellants. In some embodiments, the present gellant compositions also exhibit enhanced gelating capability over prior gellants, as evidenced by the viscosity versus temperature profile. Further, the present gellant demonstrates higher thermal stability over prior gellants, which is believed to be due to the absence of a photoinitiator end-group moiety.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink comprising a colorant, an initiator, and a phase change ink carrier, said carrier comprising at least one radically curable monomer compound and a compound of the formula

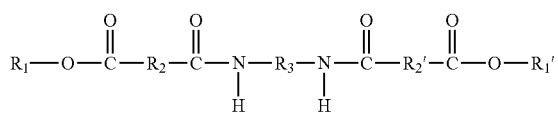

wherein $R_1$ and $R_{1'}$ can be the same or different, and wherein $R_1$ and $R_{1'}$ each, independently of the other is selected from the group consisting of (i) an alkyl group having at least one ethylenic unsaturation therein, (ii) an arylalkyl group having at least one ethylenic unsaturation therein, (iii) an alkylaryl group having at least one ethylenic unsaturation therein, and (iv) an aromatic group, provided that at least one of $R_1$ and $R_{1'}$ is an aromatic group; and provided that neither of $R_1$ or $R_{1'}$ is a photoinitiator group;

wherein $R_2$ and $R_{2'}$ are the same or different, and wherein $R_2$ and $R_{2'}$ are each independently selected from (i) alkylene groups, (ii) arylene groups, (iii) arylalkylene groups, and (iv) alkylarylene groups; and wherein $R_3$ is an alkylene group, an arylene group, (iii) an arylalkylene group, or (iv) an alkylarylene group.

2. The ink of claim 1, wherein one of $R_1$ or $R_{1'}$ is of the formula

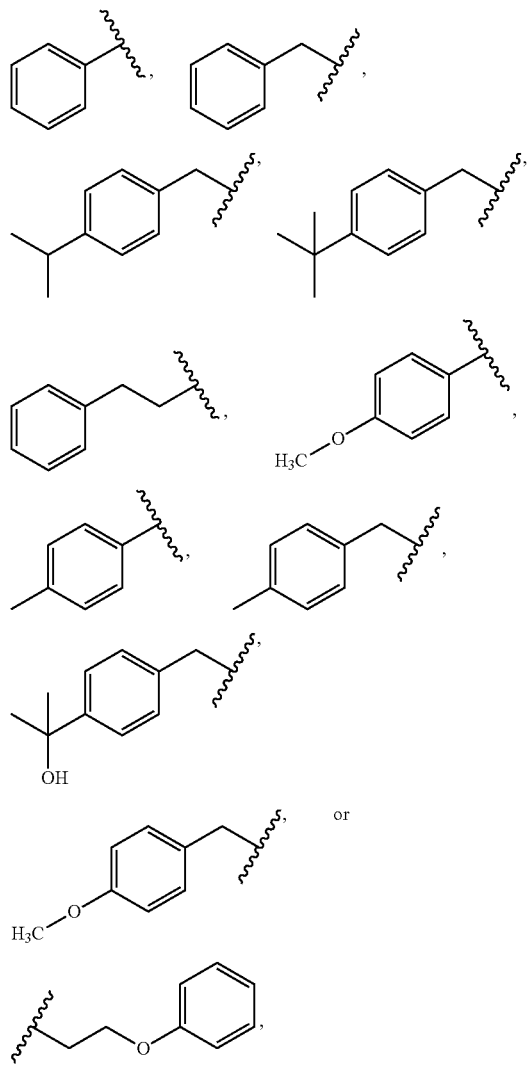

wherein ∿∿ represents the point of attachment of the $R_1$ and $R_{1'}$ group to the compound.

3. The ink of claim 1, wherein one of $R_1$ or $R_{1'}$ is of the formula

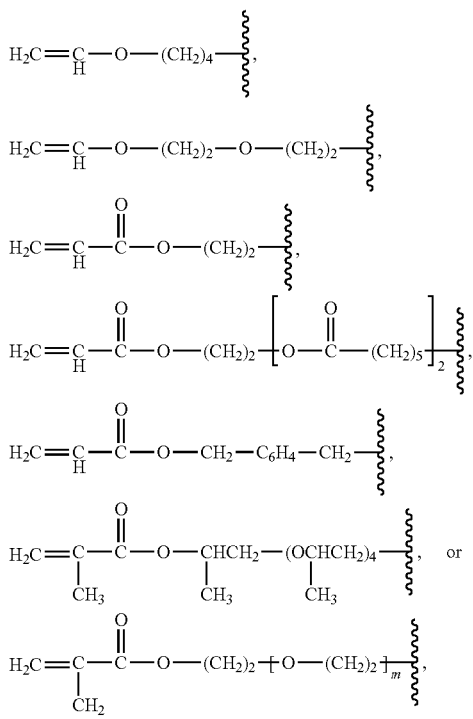

wherein m is an integer representing the number of repeating $(O-(CH_2)_2)$ units.

4. The ink of claim 1, wherein $R_2$ and $R_{2'}$ include isomers of the formula

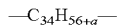

$-C_{34}H_{56+a}-$ and are branched alkylene groups which may include unsaturations and cyclic groups, and wherein a is an integer of 0, 1, 2, 3, 4, 5, 6, 7, 8, 9, 10, 11, or 12.

5. The ink of claim 1, wherein $R_2$ and $R_{2'}$ include isomers of the formula

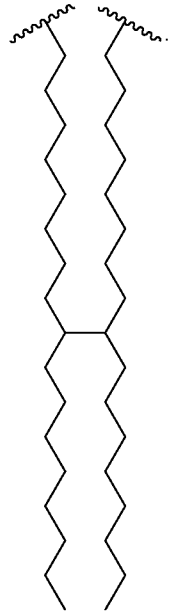 [SMILES: *CCCCCCCCC(CCCCCCCC)C(CCCCCCCC)CCCCCCCC*]

6. The ink of claim 1, wherein $R_3$ is a $-CH_2CH_2-$ group.

7. The ink of claim 1, containing a compound of the formula
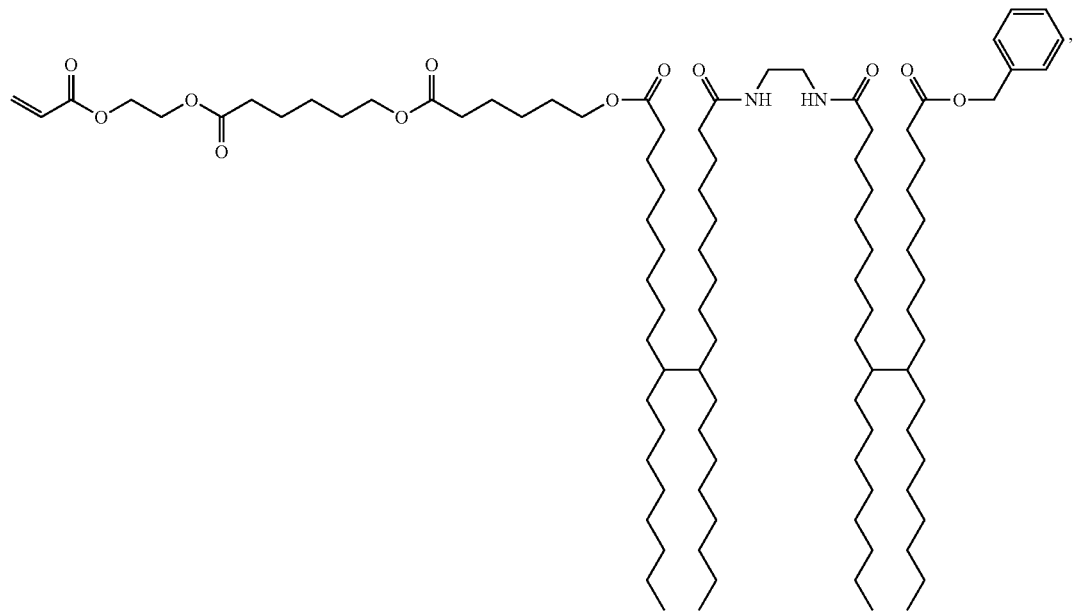
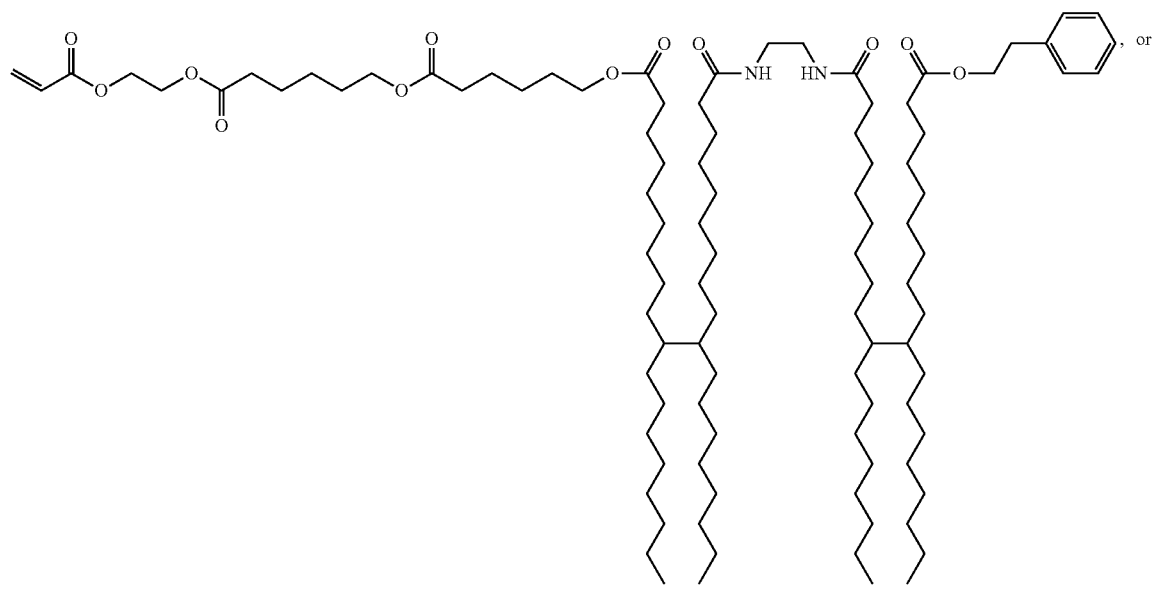

-continued

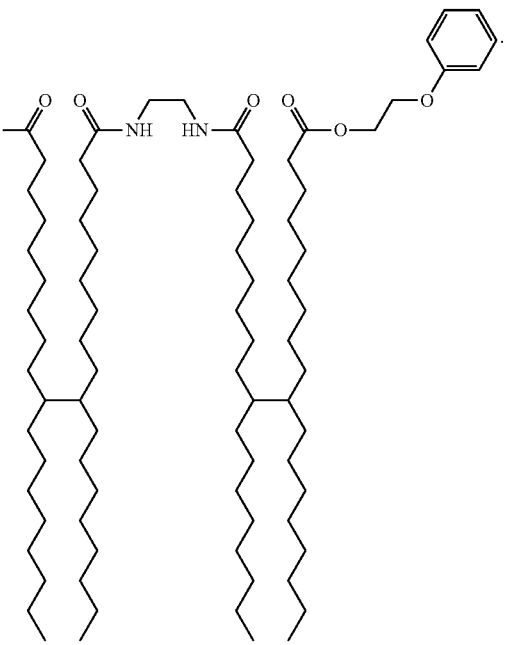

8. The ink of claim 1, wherein the radically curable monomer compound is propoxylated neopentyl diacrylate, isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, or mixtures thereof; and wherein the carrier optionally further contains a multifunctional acrylate or methacrylate compound.

9. A phase change ink comprising a colorant, an initiator, and a phase change ink carrier, said carrier comprising at least one radically curable monomer compound and a compound of the formula

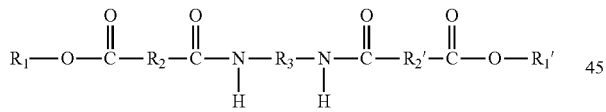

wherein $R_1$ and $R_{1'}$ are the same, and wherein $R_1$ and $R_{1'}$ are each an aromatic group;

wherein $R_2$ and $R_{2'}$ are the same or different, and wherein $R_2$ and $R_{2'}$ are each independently selected from the group consisting of (i) alkylene groups, (iii) arylalkylene groups, and (iv) alkylarylene groups; and wherein $R_3$ is an alkylene group, an arylene group, an arylalkylene group, or an alkylarylene group.

10. The ink of claim 9, wherein $R_1$ and $R_{1'}$ are each of the formula

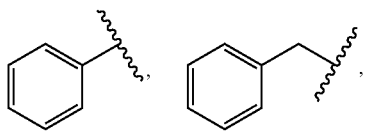

-continued

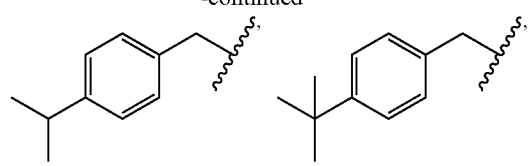

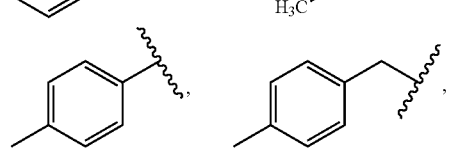

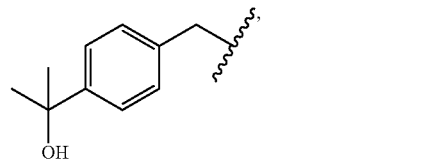

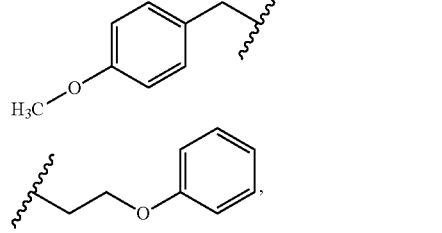

wherein ～ represents the point of attachment of the $R_1$ and $R_{1'}$ group to the compound.

11. The ink of claim 9, wherein $R_2$ and $R_{2'}$ are each groups of the formula —$C_{34}H_{56+a}$— and are branched alkylene groups which may include unsaturations and cyclic groups, and wherein a is an integer of 0, 1, 2, 3, 4, 5, 6, 7, 8, 9, 10, 11, or 12.
12. The ink of claim 9, wherein $R_2$ and $R_{2'}$ include isomers of the formula
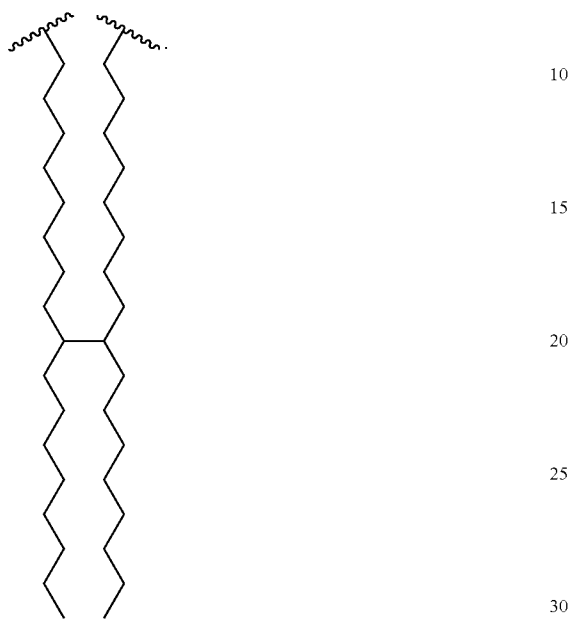
13. The ink of claim 9, wherein $R_3$ is a —$CH_2CH_2$— group.
14. The ink of claim 9, containing a compound of the formula
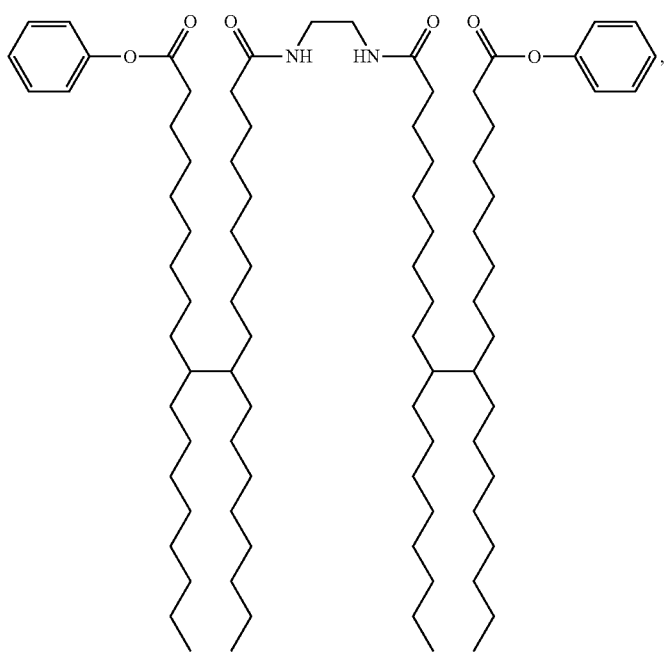

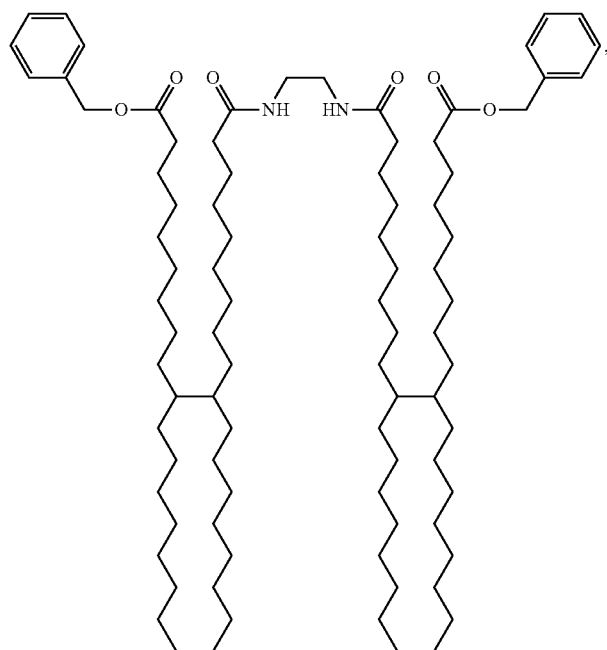
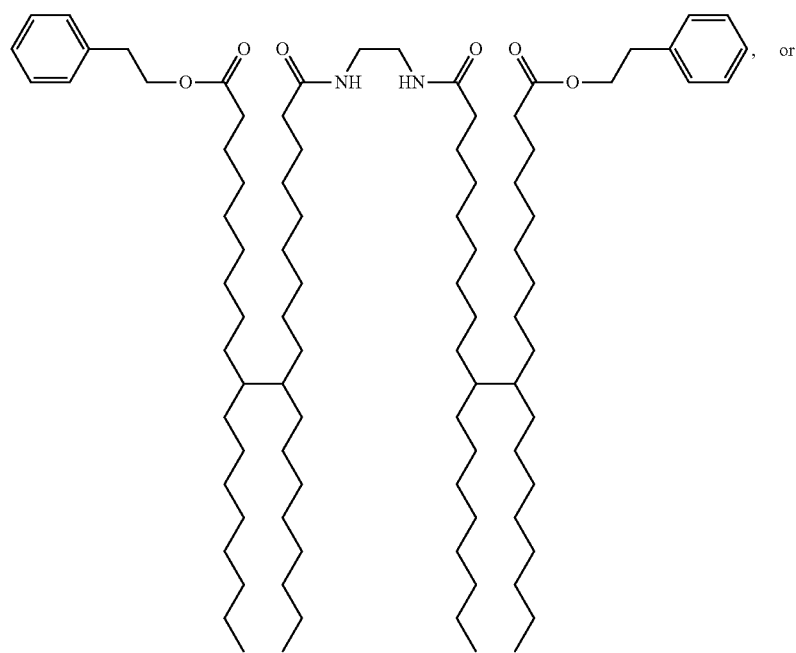

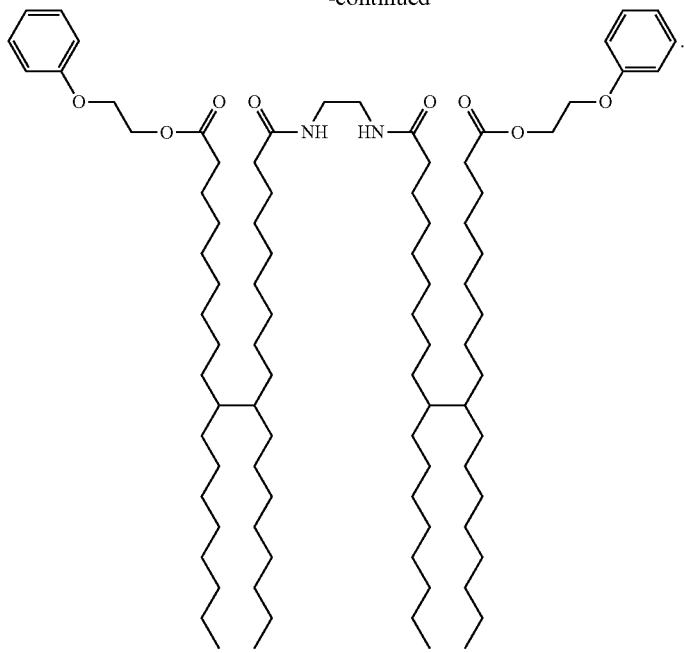

15. The ink of claim 9, wherein the radically curable monomer compound is propoxylated neopentyl diacrylate, isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, or mixtures thereof; and wherein the carrier optionally further contains a multifunctional acrylate or methacrylate compound.

16. A process which comprises:
(I) incorporating into an ink jet printing apparatus a phase change ink composition comprising a colorant, an initiator, and an ink vehicle, said ink vehicle comprising (a) at least one radically curable monomer compound, and (b) a compound of the formula

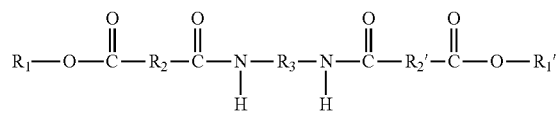

wherein $R_1$ and $R_{1'}$ are the same, and wherein $R_1$ and $R_{1'}$ are each an aromatic group; or wherein $R_1$ and $R_{1'}$ are the same or different, and wherein $R_1$ and $R_{1'}$ each, independently of the other is selected from the group consisting of (i) an alkyl group having a least one ethylenic unsaturation therein (ii) an arylalkyl group having at least one ethylenic unsaturation therein, (iii) an alkylaryl group having at least one ethylenic unsaturation therein, and (iv) an aromatic group, provided that at least one of $R_1$ and $R_{1'}$ is an aromatic group; and provided that neither of $R_1$ or $R_{1'}$ is a photoinitiator group;

wherein $R_2$ and $R_{2'}$ are the same or different, and wherein $R_2$ and $R_{2'}$ are each independently selected from the group consisting of (i) alkylene groups, arylalkylene groups, and alkylarylene groups; and wherein $R_3$ is an alkylene group, an arylene group, an arylalkylene group, or an alkylarylene group;

(II) melting the ink;
(III) causing droplets of the melted ink to be ejected in an imagewise pattern onto a substrate; and
(IV) exposing the imagewise pattern to ultraviolet radiation.

* * * * *